(12) United States Patent
Higuchi et al.

(10) Patent No.: US 11,678,686 B2
(45) Date of Patent: Jun. 20, 2023

(54) COMPOSITION CONTAINING FINE PARTICLE COMPOSITE AND METHOD FOR MANUFACTURING THE SAME

(71) Applicant: MIZKAN HOLDINGS CO., LTD., Aichi (JP)

(72) Inventors: Tatsuya Higuchi, Handa (JP); Junichiro Ihara, Handa (JP)

(73) Assignee: Mizkan Holdings Co., Ltd., Aichi (JP)

( * ) Notice: Subject to any disclaimer, the term of this patent is extended or adjusted under 35 U.S.C. 154(b) by 446 days.

(21) Appl. No.: 16/796,650

(22) Filed: Feb. 20, 2020

(65) Prior Publication Data

US 2020/0187543 A1 Jun. 18, 2020

Related U.S. Application Data

(63) Continuation of application No. PCT/JP2018/037964, filed on Oct. 11, 2018.

(30) Foreign Application Priority Data

Apr. 6, 2018 (JP) .............................. JP2018-074231

(51) Int. Cl.
*A23L 33/21* (2016.01)
*A23L 27/10* (2016.01)

(52) U.S. Cl.
CPC ............... *A23L 33/21* (2016.08); *A23L 27/10* (2016.08); *A23V 2002/00* (2013.01)

(58) Field of Classification Search
CPC .......... A23L 33/21; A23L 27/10; A23L 33/24; A23V 2002/00
USPC ......................... 426/602, 615, 648, 518, 519
See application file for complete search history.

(56) References Cited

U.S. PATENT DOCUMENTS

| | | | |
|---|---|---|---|
| 5,011,701 A * | 4/1991 | Baer et al. | |
| 5,415,804 A | 5/1995 | Minami et al. | |
| 6,495,190 B1 * | 12/2002 | Yaginuma et al. | |
| 8,118,247 B2 * | 2/2012 | Lang et al. | |
| 2010/0034753 A1 | 2/2010 | Cox et al. | |
| 2010/0143568 A1 | 6/2010 | Quail et al. | |
| 2010/0183796 A1 | 7/2010 | Hattori | |
| 2010/0186420 A1 | 7/2010 | Berry et al. | |
| 2010/0189857 A1 | 7/2010 | Blijdenstein et al. | |
| 2010/0189867 A1 | 7/2010 | Blijdenstein et al. | |
| 2010/0291280 A1 | 11/2010 | Blijdenstein et al. | |
| 2012/0244269 A1 | 9/2012 | Hattori | |
| 2017/0196253 A1 | 7/2017 | Qvyjt | |
| 2020/0221753 A1 | 7/2020 | Qvyjt | |

FOREIGN PATENT DOCUMENTS

| | | |
|---|---|---|
| CN | 101142979 A | 3/2008 |
| CN | 101528056 A | 9/2009 |
| CN | 106714544 A | 5/2017 |
| DE | 202016103980 U1 | 6/2017 |
| EP | 3539389 A1 | 9/2019 |
| EP | 3556221 A1 | 10/2019 |
| JP | H05-236888 A | 9/1993 |
| JP | H11302448 A | 11/1999 |
| JP | 2003-210129 A | 7/2003 |
| JP | 2006-141291 A | 6/2006 |
| JP | 2007-268515 A | 10/2007 |
| JP | 2009-543562 A | 12/2009 |
| JP | 2010-023001 A | 2/2010 |
| JP | 2010162008 A | 7/2010 |
| JP | 5192139 B2 | 5/2013 |
| JP | 6412297 B1 | 10/2018 |
| TW | 201249350 A | 12/2012 |
| WO | 2006/040395 A1 | 4/2006 |
| WO | 2013/118726 A1 | 8/2013 |
| WO | 2018/155488 A1 | 8/2018 |

OTHER PUBLICATIONS

Anne, M. 2018. "Insoluble Fiber in Fruits", pp. 1-5, https://healthyeating.sfgate.com/insoluble-fiber-fruits-4124.html. (Year: 2018).*
Office Action issued in corresponding European Application No. 18913761.5, dated Feb. 15, 2021 (10 pages).
Office Action issued in Chinese Application No. 201880055905.5, dated Aug. 25, 2020 (15 pages).
Betty W. Li, et al., "Individual Sugars, Soluble, and Insoluble Dietary Fiber Contents of 70 High Consumption Foods", Journal of Food Composition and Analysis, vol. 15, Issue 6, Dec. 1, 2002, pp. 715-723 (9 pages).
European Search Report issued in corresponding European Application 18913761.5, dated Jul. 3, 2020 (5 pages).
Office Action issued in corresponding Korean Application No. 2020-7004078, dated Jun. 5, 2020 (16 pages).

(Continued)

*Primary Examiner* — Helen F Heggestad
(74) *Attorney, Agent, or Firm* — Osha Bergman Watanabe & Burton LLP

(57) ABSTRACT

A composition may include a fine particle composite comprising at least 0.1 mass % of an insoluble dietary fiber. A total fat/oil content of the composition may be less than 20 mass % and the composition may have a maximum particle size that is larger than 100 μm and a modal diameter of 5 to 400 μm. When the composition is ultrasonicated, the ultrasonicated composition may have a modal diameter of 0.3 to 100 μm.

27 Claims, No Drawings

(56) References Cited

OTHER PUBLICATIONS

Wook Kim et al., "Effect of heating temperature on the particle size distribution in waxy wheat flour," Journal of Cereal Science, vol. 59, No. 2, pp. 228-233, XP055886480, Jan. 24, 2014 (6 pages).
Robert Shanks et al., "Thermoplastic Starch: Chapter 6," Thermoplastic Elastomers, pp. 95-116, XP055886732, Mar. 28, 2012(22 pages).
Byung-Man Kwak et al., "Laser diffraction particle sizing by wet dispersion method for spray-dried infant formula," Journal of Food Engineering, vol. 92, No. 3, Jun. 2009, pp. 324-330, XP025950242, Jun. 2009 (7 pages).
Examination Report issued in European Patent Application No. 18913761.5; dated Feb. 11, 2022 (12 pages).
International Search Report issued in International Application No. PCT/JP2018/037964, dated Dec. 4, 2018 (2 pages).
Written Opinion issued in International Application No. PCT/JP2018/037964, dated Dec. 4, 2018 (5 pages).

\* cited by examiner

COMPOSITION CONTAINING FINE PARTICLE COMPOSITE AND METHOD FOR MANUFACTURING THE SAME

TECHNICAL FIELD

One or more embodiments of the present invention relate to a composition containing fine particle composites that contain insoluble dietary fibers and a method for manufacturing the same.

BACKGROUND

Conventionally, it is desired that a composition containing dietary fibers having various active ingredients is willingly ingested from the viewpoint of its health function.

However, since such compositions containing a large amount of dietary fibers may be incompatible with other foods, they are not consumed satisfactorily in a daily diet, and their application has been hindered.

Compositions that contain simply crushed dietary fibers have been reported, for example, a seasoning (Patent Literature 1) obtained by crushing green-yellow vegetables in the presence of oil, or a spread food (Patent Literature 2) obtained by crushing non-nut vegetable materials to produce a powder having a mean particle size of less than about 100 μm and then subjecting the obtained powder to elevated temperature.

As a technique for reducing agglomerates generated at the time of pulverization of particles, there has been reported a manufacturing process (Patent Literature 3) of fine particle dispersions in which fine particle agglomerated powders are wetly pulverized and pulverized while suppressing re-agglomeration of pulverized fine particles.

Especially, the astringency of food containing insoluble dietary fibers which are not soluble in water has been a major obstacle to their daily intake.

As a technique for improving the astringency of food products, there has been reported a method for producing pulp-like jellies (Patent Literature 4) in which the astringency and bitterness derived from chitosan are suppressed by adding calcium salt or sulfate salt and the taste is improved.

[Patent Literature 1] JP-A-2006-141291
[Patent Literature 2] JP-A-2009-543562
[Patent Literature 3] JP-A-2010-023001
[Patent Literature 4] JP-A-hei 5-236888

However, Patent Literatures 1 and 2, when applied to foods containing insoluble dietary fibers, were not capable of improving taste, particularly astringency, and were also inadequate in terms of eatability.

Patent Literature 3 is a technique that cannot be applied to foods because it uses a silane coupling agent as a dispersant.

Patent Literature 4 was a technique that was effective in improving astringency from chitosan, but not applicable to water-insoluble dietary fiber-containing foods.

SUMMARY

One or more embodiments may improve the taste of foods containing insoluble dietary fibers, such as its astringent taste, and its eatability.

As a result of intensive studies, the present inventors have found in one or more embodiments that, by fining water-insoluble dietary fibers to shape composites which can be crushed by external disturbance, and by controlling the shapes of the composites within predetermined ranges, the characteristics such as astringency and the like derived from insoluble dietary fibers may be improved.

It has also been found that compositions of one or more embodiments comprising particulate composites of such insoluble dietary fibers have various other favorable properties and are applicable not only to foods but also to other applications.

That is, one or more embodiments may provide the following [1] to [27].

[1] A composition comprising a fine particle composite comprising an insoluble dietary fiber, the composition satisfying the following (1) to (5) and simultaneously satisfying one or more of the following (6-1) to (6-3):

(1) 0.1 mass % or more of the insoluble dietary fiber is comprised,
(2) a total fat/oil content is less than 20 mass %,
(3) a maximum particle size before ultrasonication is larger than 100 μm,
(4) a modal diameter before ultrasonication is 5 μm or more and 400 μm or less,
(5) a modal diameter after ultrasonication is 0.3 μm or more and 100 μm or less,
(6-1) a numerical value N(I) determined by the following formula (I) is 1.20 or more, (Expression 1)

$$N(I) = (\alpha/\beta) \tag{I}$$

(6-2) a numerical value N(II) determined by the following formula (II) is 1.40 or more, (Expression 2)

$$N(II) = (\alpha/\beta)/\omega \tag{II}$$

(6-3) a numerical value N(III) determined by the following formula (III) is 0.50 or more, (Expression 3)

$$N(III) = (\alpha/\beta) \times \gamma_A \tag{III}$$

wherein
α represents a 90 percentile value of a "long diameter" before ultrasonication measured by a particle shape image analyzer,
β represents a 90 percentile value of a "short diameter" before ultrasonication measured by a particle shape image analyzer,
ω represents a 10 percentile value of a "degree of unevenness" before ultrasonication measured by a particle shape image analyzer, and
$\gamma_A$ represents a specific surface area per unit volume after ultrasonication.

[2] The composition according to [1], wherein a water content/(water content+total fat/oil content) is 75% or more.
[3] The composition according to [1] or [2], wherein a ratio of a specific surface area per unit volume before ultrasonication ($\gamma_B$) to a specific surface area per unit volume after ultrasonication ($\gamma_A$), ($\gamma_B/\gamma_A$), is 0.8 or less.
[4] The composition according to any one of [1] to [3], wherein an emulsification capacity is 50% or more.
[5] The composition according to any one of [1] to [4], wherein a content of the fine particle composite is 4 mass % or more and 98 mass % or less.
[6] The composition according to any one of [1] to [5], wherein the insoluble dietary fiber includes a fiber(s) derived from an edible part and/or an inedible part of an insoluble dietary fiber-comprising food material.

[7] The composition according to [6], wherein the insoluble dietary fiber includes fibers derived from an edible part and an inedible part of an insoluble dietary fiber-comprising food material of the same kind.
[8] The composition according to [6] or [7], wherein the insoluble dietary fiber-comprising food material is one or more selected from the group consisting of nuts and seeds, grains, beans, vegetables and fruits.
[9] The composition according to [8], wherein the insoluble dietary fiber-comprising food material is one or more selected from the group consisting of carrots, squashes, corns, soybeans, edamame, bell peppers, beets, green peas, broccolis and tomatoes.
[10] The composition according to [9], wherein the inedible part of the insoluble dietary fiber-comprising food material is one or more selected from the group consisting of sweet corn cores, bell pepper seeds or stems, squash seeds or guts, beet skins, broccoli stalks and leaves, edamame pods and tomato stems.
[11] The composition according to any one of [6] to [10], comprising a ground product of the insoluble dietary fiber-comprising food material.
[12] The composition according to [11], wherein the ground product is a media agitating mill-treated product.
[13] The composition according to [12], wherein the media agitating mill-treated product is a wet media agitating mill-treated product.
[14] The composition according to any one of [11] to [13], satisfying one or more of the following (6-1') to (6-3'):
(6-1') the composition is in a state of being ground until the numerical value N(I) determined by the formula (I) increases by 5% or more after grinding from that therebefore,
(6-2') the composition is in a state of being ground until the numerical value N(II) determined by the formula (II) increases by 5% or more after grinding from that therebefore, and
(6-3') the composition is in a state of being ground until the numerical value N(III) determined by the formula (III) increases by 5% or more after grinding from that therebefore.
[15] A food/drink product comprising the composition according to any one of [1] to [14].
[16] A liquid seasoning comprising the composition according to any one of [1] to [14].
[17] A method for producing the composition according to any one of [1] to [14], the method comprising grinding an insoluble dietary fiber-comprising food material.
[18] The method according to [16] or [17], wherein the grinding is media agitating mill treatment.
[19] The method according to [18], wherein the grinding is wet media agitating mill treatment.
[20] The method according to any one of [17] to [19], wherein the media agitating mill treatment is carried out under a pressure applying condition of a maximum pressure of 0.01 MPa or more and 1 MPa or less.
[21] The method according to any one of [17] to [20], wherein the media agitating mill treatment is carried out under a temperature increasing condition in which treatment temperature $T_1$(° C.) at the time of starting the treatment and treatment temperature $T_2$(° C.) at the time of completing the treatment satisfy the following formula (A).

(Expression 4)

$$T_1+1<T_2<T_1+50 \quad (A)$$

[22] The method according to any one of [17] to [21], wherein a water activity value of the insoluble dietary fiber-comprising food material is 0.95 or less.
[23] The method according to any one of [17] to [22], wherein an available carbohydrate in the insoluble dietary fiber-comprising food material is 2 mass % or more.
[24] A method for enhancing an emulsification capacity of a composition comprising an insoluble dietary fiber, the method comprising grinding the composition comprising an insoluble dietary fiber to obtain the composition according to any one of [1] to [14].
[25] A method for improving an astringent taste of a composition comprising an insoluble dietary fiber, the method comprising grinding the composition comprising an insoluble dietary fiber to obtain the composition according to any one of [1] to [14].
[26] A method for producing a liquid seasoning comprising the composition according to any one of [1] to [14].
[27] The method according to any one of [17] to [26], wherein grinding is carried out until one or more of the following (6-1') to (6-3') are satisfied:
(6-1') the numerical value N(I) determined by the formula (I) increases by 5% or more after grinding from that therebefore,
(6-2') the numerical value N(II) determined by the formula (II) increases by 5% or more after grinding from that therebefore, and
(6-3') the numerical value N(III) determined by the formula (III) increases by 5% or more after grinding from that therebefore.

The composition containing fine-particle composite of insoluble dietary fibers of one or more embodiments provides excellent properties such as reducing astringency as derived from the insoluble dietary fibers.

DETAILED DESCRIPTION

Although examples of one or more embodiments of the present invention will now be described, the present invention is not limited to these embodiments and any modification can be made without departing from the scope of the present invention.
[Composition Containing Insoluble Dietary Fibers]
One or more embodiments relate to a composition containing insoluble dietary fibers (hereinafter it may be abbreviated as simply the "composition of one or more embodiments."
[Insoluble Dietary Fibers]
The composition of one or more embodiments comprises insoluble dietary fibers. In one or more embodiments, the "dietary fibers" means a general stuff for indigestible components in food products which are not digested by human digestive enzymes. In one or more embodiments, the "insoluble dietary fibers" refers to those which are water-insoluble among the dietary fibers. Examples of the insoluble dietary fiber include, but not limited thereto, lignin, cellulose, hemicellulose, chitin, and chitosan. However, lignin, particularly acid-soluble lignin, among insoluble dietary fibers have notably poor eatability which is thus supposed to notably benefit the eatability improvement effect when one or more embodiments are applied. For this reason, lignin, particularly acid-soluble lignin, is preferable as the insoluble dietary fiber.

The composition of one or more embodiments comprises insoluble dietary fibers at a certain content percentage or more. Specifically, the lower limit of the content percentage of insoluble dietary fibers in the composition of one or more embodiments is typically 0.1 mass % or more. Particularly, it is preferable that the lower limit thereof be additionally 0.2 mass % or more, further 0.3 mass % or more, further 0.4 mass % or more, further 0.5 mass % or more, and furthermore 0.7 mass % or more, or 1 mass % or more, or 1.5 mass % or more, or 2 mass % or more and particularly 3 mass % or more. When a content of insoluble dietary fibers is higher than the lower limit, the taste of the resulting food is critically improved. On the other hand, the upper limit of content percentage of insoluble dietary fibers in the composition of the present invention is not limited and, from the viewpoint of industrial productivity, it is preferable to be typically 20 mass % or less, additionally 15 mass % and further 10 mass % or less.

The composition of insoluble dietary fibers in the composition of one or more embodiments is not limited. However, from the reason described above, the eatability improvement effect is supposed to be more notably obtained by the application of one or more embodiments when a percentage of lignin (thereamong, acid-soluble lignin) in all the insoluble dietary fibers is a certain value or more. Specifically, it is preferable that a dry mass percentage of lignin (of these, acid-soluble lignin) in all the insoluble dietary fibers be typically 5% or more, additionally 10% or more, further 30% or more.

In one or more embodiments, the origin of insoluble dietary fibers is not limited and may be those derived from various natural materials containing insoluble dietary fibers or those synthesized. In the former case, insoluble dietary fibers comprised in various materials may be isolated and purified but such materials containing insoluble dietary fibers may also be used directly. In the latter case, food materials are preferable as the material comprising insoluble dietary fibers. The insoluble dietary fiber-comprising food materials are to be described hereinafter.

Examples of the quantitative method for the dietary fibers and the insoluble dietary fibers include the modified Prosky method.

[Insoluble Dietary Fiber-Containing Food Materials]

As described above, insoluble dietary fibers contained in the composition of the present invention are preferably those derived from food materials. Especially, the composition of one or more embodiments contains an insoluble dietary fiber-containing food material. The kind of insoluble dietary fiber-containing food material is not limited and any food materials suitable for eating and drinking can be used. However, it is preferable to include a certain percentage of insoluble dietary fibers. Specifically, it is preferable that a dry mass percentage of insoluble dietary fibers in the food material be typically 1 mass % or more, particularly 3 mass % or more, further 5 mass % or more and furthermore 10 mass % or more.

Examples of such insoluble dietary fiber-containing food material include, but not limited thereto, plant-based food materials, microbe-based food materials and animal-based food materials. Of these, plant-based food materials are preferable. Examples of the plant-based food material include, but not limited to, vegetables (including tubers and roots and mushrooms), fruits, spices, algae, grains, nuts and seeds and beans. These food materials may be used singly, or two or more may be used together in any combination. Alternatively, these food materials may be used directly, or may be used after various treatments (for example, drying, heating, removing harshness, skinning, removing nuts and seeds, after-ripening, salting and skin processing) are applied.

In one or more embodiments, the kinds of vegetables are not limited as long as an edible part and/or an inedible part thereof contains insoluble dietary fibers. Examples include, but not limited to, radish, carrot, rutabaga, parsnip, turnip, black salsify, sweet potato, cassava, yacon, taro, eddoe, konnyaku yam, tashiroimo (Polynesian arrowroot), lotus root, potato, purple sweet potato, beet (preferably beetroot: cultivated varieties of beet taproot for consumption), Jerusalem artichoke, threeleaf arrowhead, shallot, garlic, Rakkyo, lily bulb, Asian fawnlily, kale, yam, Japanese yam, Chinese yam, onion, asparagus, Japanese spikenard, cabbage, lettuce, spinach, Chinese cabbage, turnip rape, Japanese mustard spinach, pak choi, Oriental garlic, scallion, nozawana, giant butterbur, fudanso (Swiss chard), water green, tomato, eggplant, squash, green pepper, cucumber, myoga, cauliflower, broccoli, edible chrysanthemum, bitter melon, okra, artichoke, zucchinis, sugar beet, tigernut, ginger, perilla, horseradish, bell pepper, herbs (watercress, coriander, water spinach, celery, tarragon, chive, chervil, sage, thyme, laurel, parsley, mustard green (karashina), myoga, mugworts, basil, oregano, rosemary, peppermint, savory, lemon grass, dill, horseradish leaf, Japanese pepper leaf, stevia), western bracken fern, Asian royal fern, Japanese arrowroot, tea plant (tea), bamboo shoot, shiitake mushroom, matsutake mushroom, Jew's Ear Fungus, hen of the woods, polypore, oyster mushroom, king trumpet mushroom, enokitake mushroom, shimeji mushroom, honey mushroom, common mushroom, butterscotch mushroom, Jersey cow mushroom, hatsutake mushroom and weeping milk cap. Of these, carrot, squash, tomato, bell pepper, cabbage, beet (preferably beetroot), onion, broccolis, asparagus, purple sweet potato and sweet potato are preferable, and carrot, squash, tomato, bell pepper, beet (preferably beetroot), and broccoli are particularly preferable.

In one or more embodiments, the kinds of fruits are not limited as long as an edible part and/or an inedible part thereof contains insoluble dietary fibers. Examples include, but not limited thereto, Chinese quince, Siberian pear (white pear, Chinese pear), pear, quince, common medlar, amelanchier canadensis, shipova, apple, American cherry (black cherry, dark cherry), apricot, plum, cherry (sweet cherry), sour cherry, blackthorn, Japanese plum, peach, ginkgo, chestnut, chocolate vine, fig, persimmon, blackcurrant, raspberry, kiwi fruit, silverberry, mulberry (dodome), cranberry, cowberry (iwamomo, hamanashi, okamaringo), pomegranate, Hardy kiwi (shirakuchizuru, kokuwa), sea buckthorn (saji, hippophae, seaberries), gooseberry, jujube, Japanese bush cherry (koume, ikuri), blue honeysuckle, bilberry, redcurrant, grape, blackberry, blueberry, pawpaw, matsubusa, raspberry, downy cherry, Mandarin orange, kumquat, trifoliate orange, olive, loquat, Japanese bayberry, monk fruit, tropical fruits (e.g., mango, mangosteen, papaya, cherimoya, atemoya, banana, durian, star fruit, guava, pineapple, acerola, passion fruit, dragon fruit, lychee and canistel), strawberry, apple, watermelon, melon, avocado, miracle fruit, orange, lemon, prune, yuzu, sudachi, grapefruit, bitter orange and flat lemon. Of these, avocado and apple are preferable.

In one or more embodiments, the kinds of algae are not limited as long as an edible part and/or an inedible part thereof contains insoluble dietary fibers. Examples include, but not limited thereto, macroalgae such as konbu kelp, wakame seaweed, laver, green laver and red alga; and microalgae such as green alga, red alga, blue-green alga, dinoflagellate and euglena. Specific examples include sea lettuce, green laver, perforated sea lettuce, green caviar (kubirezuta), katashiokusa, green caviar, kuromiru, tamamiru, torinoashi (yuikiri), hitoegusa, hiraaonori, fusaiwazuta, grass kelp, akamoku, amijigusa, arame sea oak, antokume, ishige, ichimegasa, iroro, heath, umitoranoo, sea fan, oobamoku, Okinawa mozuku, kaigara amanori, kagome nori, kajime (arame sea oak), kayamonori, gibasa (akamoku, ginbaso, jinbaso, jibasa), sanadagusa, shiwanokawa, shiwayahazu, seiyo habanori, tsuruarame, nanori (kayamonori), nebarimo, nokogirimoku, habanori, hijiki, hirome, oyster thief, futomozuku, hondawara, konbu kelps (particularly, makonbu, rishiri konbu), rigid hornwort, mugiwara nori (kayamonori), muchimo, moduku (mozuku), yuna, wakame, Asakusa nori, ibotsunomata, ushikenori, usukawakaninote, ezotsunomata (kurohaginnanso), oobusa, ogonori, okitsunori, obakusa, katanori, kabanori, kamogashiranori, kijinoo, kurohaginnanso (ezotsunomata), sakuranori, shiramo white algae, tanbanori, tsunomata, tsurushiramo, tsurutsuru, tosakanori, tosakamatsu, nogenori (fukuro funori), laver (nori, susabinori), hanafunori, harigane, hiragaragara, hirakusa, hiramukade, pirihiba, fukuro funori, fushitsunagi, makusa, maruba amanori, mitsudesozo, euglena, chlorella, mirin, mukadenori, yuikiri, yukari and red algae. Of these, konbu kelp, laver and green laver are particularly preferable. Of these algae, some of the microalgae such as chlorella have an extremely strong cell wall and are thus likely to have difficulty in forming composites of fine particles containing insoluble dietary fibers to be described hereinafter. For this reason, it is preferable to use microalgae pre-treated for cell wall destruction or use algae other than microalgae.

In one or more embodiments, the kinds of nuts and seeds are not limited as long as an edible part and/or an inedible part thereof contains insoluble dietary fibers. Examples include, but not limited thereto, almond, cashew nut, pecan, macadamia nut, pistachio, hazelnut, coconut, pine nut, sunflower seed, squash seed, watermelon seed, chinquapin, walnut, chestnut, ginkgo, sesame and Brazil nut. Of these, almond, cashew nut, macadamia nut, pistachio, hazelnut and coconut are preferable.

In one or more embodiments, the kinds of beans are not limited as long as an edible part and/or an inedible part thereof contains insoluble dietary fibers. Examples include, but not limited thereto, string bean, kidney bean, red string bean, white string bean, black bean, pinto bean, toramame bean, lima bean, scarlet runner bean, peas (particularly green pea, which are immature seeds), pigeon pea, mung bean, black-eyed pea, adzuki bean, broad bean, soybean (particularly edamame), chick pea, Lens culinari, hiramame, lentil, peanut, lupinus bean, grass pea, carob, twisted cluster bean, African locust bean, coffee bean, cocoa bean and Mexican jumping bean. Of these, peas (particularly green pea, which are immature seeds) and soybeans (particularly edamame) are preferable. Cacao mass, a processed product of cocoa bean, can also be used but cocoa beans are fermented during the production steps and further the husk and germ of cocoa beans are separated in the production steps thereby providing less of the original flavor. For this reason, it is preferable to use cocoa bean, when used, in forms other than cacao mass.

In one or more embodiments, the kinds of grains are not limited as long as an edible part and/or an inedible part thereof contains insoluble dietary fibers. Examples include, but not limited thereto, corns (particularly sweet corn), rice, wheat, barley, great millet, oat, triticale, rye, buckwheat, fonio, quinoa, barnyard millet, foxtail millet, millet, giant corn, sugar cane and amaranthus. Of these, corn (particularly sweet corn) and giant corn are preferable.

In one or more embodiments, the kinds of spices are not limited as long as an edible part and/or an inedible part thereof contains insoluble dietary fibers. Examples include, but not limited thereto, white pepper, red pepper, chili pepper, horseradish, mustard, poppy seed, nutmeg, cinnamon, cardamom, cumin, saffron, allspice, clove, Japanese pepper, orange peel, fennel, licorice, fenugreek, dill seed, Chinese pepper, long pepper and olive fruit. Of these, white pepper, red pepper and chili pepper are particularly preferable.

For the insoluble dietary fiber-containing food material, any food materials containing various examples provided above can be suitably selected and used but the selection is preferably made particularly considering the following properties.

For the insoluble dietary fiber-containing food material, it is preferable to use food materials having a predetermined value or more of an available carbohydrate from the viewpoint of forming fine particle composites to be described hereinafter in the composition.

Specifically, it is preferable that the available carbohydrate in the insoluble dietary fiber-containing food materials be typically 2% or more, additionally 3% or more, further 5% or more, furthermore 7% or more and particularly 10% or more. Food materials having a low monosaccharide equivalent such as sesame (the available carbohydrate is about 1 mass %) can also be used but it is preferable to use food materials having the lower limit or more of the available carbohydrate from the viewpoint of forming fine particle composites to be described hereinafter in the composition. When a dried food material is used as the insoluble dietary fiber-containing food material as described hereinafter, the available carbohydrate after being dried is preferably the lower limit or more. An available carbohydrate content in a food material means the total value of directly analyzed components (starch, glucose, fructose, sucrose, maltose, lactose, galactose and trehalose) in the carbohydrates measured in accordance with the method described in the STANDARD TABLES OF FOOD COMPOSITION IN JAPAN and the usable unit is "% (monosaccharide equivalent g/100 g)".

In one or more embodiments, the water activity of the insoluble dietary fiber-containing food material is not particularly limited and it is preferable that a water activity be a predetermined value or less from the viewpoint of forming fine particle composites to be described hereinafter in the composition. Specifically, it is preferable that a water activity of an insoluble dietary fiber-containing food material be typically 0.95 or less, additionally 0.9 or less, further 0.8 or less and furthermore 0.65 or less. Water activities of common fruits and vegetables are often higher than the upper limit value described above and thus it is preferable that such a food material, when used as the insoluble dietary fiber-containing food material, be subjected to dry treatment in advance as described hereinafter. The lower limit of water activity of the insoluble dietary fiber-containing food material is not particularly limited but it is preferable to be 0.10 or more, additionally 0.20 or more, further 0.30 or more and furthermore 0.40 or more from the viewpoint of easiness in storage management. The water activity of a food material can be measured in accordance with a routine method using a common water activity meter.

In one or more embodiments, the form of the insoluble dietary fiber-containing food material is not particularly limited and a raw food material may be used or those subjected to various treatments as described above (for example, drying, heating, removing harshness, skinning, removing nuts and seeds, after-ripening, salting and skin processing) may be used. However, it is preferable to use a food material subjected to dry treatment in advance, that is, a dry food material, from the viewpoint of forming fine particle composites to be described hereinafter in the composition. The method for drying a food material can be any method commonly used for drying food materials. Examples include drying in the sun, drying in the shade, freeze drying, air drying (for example, hot-air drying, fluidized bed drying, spray drying, drum drying and low-temperature drying), drying under applied pressure, drying under reduced pressure, microwave drying and oil-heat drying. Of these, methods of air drying (for example, hot-air drying, fluidized bed drying, spray drying, drum drying and low-temperature drying) and freeze drying are preferable from the aspect of low degrees of changes in the original color tone and flavor found in a food material and controlling smells (burned smell, etc.) other than a food product.

When an insoluble dietary fiber-containing food material is used in the composition of one or more embodiments, the usage percentage thereof is not limited and any percentage can be used depending on the kind of food material and the content percentage of the insoluble dietary fibers. However, the composition containing at least a certain percentage of an insoluble dietary fiber food material is preferable because more notable effects by the application of one or more embodiments are achieved. Specifically, it is preferable that a total mass percentage of an insoluble dietary fiber-containing food material on a dry mass basis to the total mass of insoluble components in the composition (insoluble components in the composition) on a dry mass basis be typically 30 mass % or more, additionally 50 mass % or more, further 70 mass % or more, furthermore 90 mass % or more and particularly 100 mass %. When the composition is a food product, all insoluble components contained therein are supposed to be derived from food materials but when these food materials are separated into insoluble dietary fiber-containing food materials and other (not containing insoluble dietary fibers) food materials, the above percentage can be calculated. For example, when a certain composition contains 20 parts by mass of insoluble dietary fiber-containing fine particles derived from a dried carrot product which is an insoluble dietary fiber-containing food material, 30 parts by mass of dried tuna which is the other (not containing insoluble dietary fiber) food material and 50 parts by mass of water, a percentage of the insoluble dietary fiber-containing food material (carrot: 20 parts by mass) to the insoluble component (dried carrot+dried tuna: 50 parts by mass) is 40 mass %.

[Other Food Materials]

The composition of one or more embodiments may contain any one or more food materials which do not contain insoluble dietary fiber other than the insoluble dietary fiber-containing food materials described above. Examples of such food materials include plant-based food materials, microbe-based food products and animal-based food materials.

[Inedible Parts and Edible Parts of Food Materials]

When food materials used in the composition of one or more embodiments, that is, insoluble dietary fiber-containing food materials and/or other (not containing insoluble dietary fibers) food materials, contain edible parts together with inedible parts, the edible parts may be used alone, or the inedible parts may be used or the edible parts and inedible parts may be used together. In one or more embodiments, the "inedible part" of a food material represents parts unsuitable for typical consumption of the food material and parts disposed in the typical dietary custom, and the "edible part" represents the parts remained when the disposal parts (inedible parts) are removed from the whole food material. Particularly, for insoluble dietary fiber-containing food materials, the parts containing insoluble dietary fibers have poor eatability and compatibility with other food products and thus have been often disposed without being used for eating but such inedible parts containing insoluble dietary fibers can now be used in one or more embodiments. In one or more embodiments, inedible parts are contained in the composition, on a wet weight basis, in preferably 0.1 mass % or more, further preferably 0.5 mass % or more, further preferably 0.8 mass % or more, further preferably 1.0 mass % or more, further preferably 2.0 mass % or more and most preferably 3.0 mass % or more. It is preferable that the upper limit of the mass percentage be typically 98 mass % or less, additionally 91 mass % or less, further 85 mass % or less, furthermore 80 mass % or less and particularly 55 mass % or less.

The edible parts and/or inedible parts of the insoluble dietary fiber-containing food materials used in the composition of one or more embodiments may be those respectively derived from insoluble dietary fiber-containing food materials of a single kind or any combination of those derived from insoluble dietary fiber-containing food materials of several kinds. When both edible parts and inedible parts are combined, a proportion of the "inedible parts/(edible parts+inedible parts)" is preferably 0.2% or more because the taste of edible parts enhances, further preferably 0.5% or more, further preferably 0.8% or more, further preferably 1.0% or more, further preferably 2.0% or more and most preferably 3.0% or more. Further, it is preferable that the upper limit of the above proportion be typically 100% or less, additionally 90% or less, further 80% or less, furthermore 70% or less and particularly 60% or less.

When the composition of one or more embodiments contains both edible parts and inedible parts of insoluble dietary fiber-containing food materials, these edible parts and inedible parts may be those respectively derived from insoluble dietary fiber-containing food materials of different kinds, but it is preferable to contain edible parts and inedible parts derived from insoluble dietary fiber-containing food materials of the same kind. That is, when a part or whole of the edible parts and a part or whole of the inedible parts derived from insoluble dietary fiber-containing food materials of the same kind are used, the nutrition of such insoluble dietary fiber-containing food materials can be consumed without waste. Particularly, in the composition of one or more embodiments, the astringent taste caused by the insoluble dietary fibers is improved as described hereinafter and thus such inedible parts of food materials containing abundant insoluble dietary fibers can be easily consumed without waste.

Examples of the inedible part of insoluble dietary fiber-containing food materials include skins, nuts and seeds, cores and strained lees of various insoluble dietary fiber-containing food materials described hereinbefore. Of these, skins, nuts and seeds, cores and strained lees of corn (examples include sweet corn), bell pepper, squash, beet, broccoli, edamame, tomato, rice, onion, cabbage, apple, grape, sugar cane, citrus fruits (examples include satsuma orange and yuzu), but not limited thereto, can be preferably used for one or more embodiments because the nutrition remains in abundance. Specific examples of the inedible part of insoluble dietary fiber-containing food materials include, but not limited thereto, bract, pistil and cob (core) of corn (examples include sweet corn), seed and stem of bell pepper, seed or gut of squash, skin of beet, stalk and leaf of broccoli, pod of edamame, stem of tomato, rice hull of rice (hull), skin (protective outer covering), bottom part and head part of onion, core of cabbage, core of apple, skin and seed of grape, strained lee of sugar cane, skin, seed and albedo of citrus fruits (examples include satsuma orange and yuzu). Additionally, the inedible part is preferably those that do not contain components harmful to the human body to the extent that they affect the human body.

When the composition of one or more embodiments contains other (not containing insoluble dietary fibers) food materials in addition to insoluble dietary fiber-containing food materials, edible parts and/or inedible parts thereof can also be used in any combination as in the insoluble dietary fiber-containing food material.

Parts and percentage of inedible parts in food materials used in the composition of one or more embodiments, that is, insoluble dietary fiber-containing food materials and/or other (not containing insoluble dietary fiber) food materials, can be naturally understood by a person skilled in the art who handles such food products and processed products of the food products. As an example, "Disposal part" and "Disposal rate" described in the STANDARD TABLES OF FOOD COMPOSITION IN JAPAN 2015 (seventh revised edition) are referred to, and these can be applied as the parts and percentage of inedible parts. The following Table 1 includes examples of insoluble dietary fiber-containing food materials and "Disposal part" and "Disposal rate" (that is, parts and percentage of inedible parts) of these food materials described in the STANDARD TABLES OF FOOD COMPOSITION IN JAPAN 2015 (seventh revised edition). Parts and percentage of edible parts in food materials can also be understood based on the parts and percentage of inedible parts.

TABLE 1

| Insoluble dietary fiber-containing food material | Inedible part (disposal part) | Percentage of inedible part (disposal rate) |
|---|---|---|
| Vegetables/Edamame/raw | Pod | 45% |
| Vegetables/(corns)/sweet corn/immature seeds, raw | Bract, pistil and cob | 50% |
| Vegetables/(Squash)/Japanese Kabocha squash/fruit, raw | Gut, seed and both ends | 9% |
| Vegetables/(green peppers)/red pepper/fruit, raw (bell pepper) | Stem, core and seed | 10% |
| Vegetables/beets/root, raw | Root end, skin and petiole | 10% |
| Vegetables/broccoli/floret, raw | Stalk and leaf | 50% |
| Vegetables/(tomatoes)/tomato/fruit, raw | Stem | 3% |
| (Cabbages)/cabbage/head leaf, raw | Core | 15% |

[Fat/Oil]

The composition of one or more embodiments may contain one or more fats/oils. For the kinds of fat/oil, one or more in any combination of various fatty acids (for example, linoleic acid, linolenic acid, oleic acid, palmitic acid, stearic acid, hexanoic acid, octanoic acid, decanoic acid, lauric acid, myristic acid and pentadecanoic acid) may be used but it is preferable to use edible fat/oil, or food materials containing edible fat/oil and food materials having edible fat/oil as raw materials.

Examples of the edible fat/oil include sesame oil, rapeseed oil, high oleic rapeseed oil, soybean oil, palm oil, palm stearin, palm olein, palm kernel oil, palm middle fraction (PMF), cottonseed oil, corn oil, sunflower oil, high-oleic sunflower oil, safflower oil, olive oil, linseed oil, rice-bran oil, camellia oil, perilla oil, flavor oil, coconut oil, grapeseed oil, peanut oil, almond oil, avocado oil, salad oil, canola oil, fish oil, beef tallow, lard, chicken fat, or MCT (middle chain triglyceride), diglyceride, hydrogenated oil, transesterified oil, cream, ghee and cacao butter. Of these, liquid edible fats/oils such as sesame oil, olive oil, rapeseed oil, soybean oil, cream, sunflower oil, rice-bran oil and palm olein are preferable because they have an effect of enhancing the smoothness of the composition. Meanwhile, fats/oils other than cacao butter are preferably used for better handling during production. These edible fats/oils may be used alone, or two or more may be used together in combination. The edible fats/oils, when containing a higher proportion of unsaturated fatty acids (total proportion of monounsaturated fatty acids and polyunsaturated fatty acids) than a proportion of saturated fatty acids, are preferable because microrefinement treatment can be carried out efficiently, and further preferable when a proportion of unsaturated fatty acids is higher than twice the amount of a proportion of saturated fatty acids.

Examples of the food material having edible fats/oils as raw materials include butter, margarine, shortening, heavy cream and soymilk cream (for example, "Ko-cream (Kokurimu) (registered trademark) by FUJI OIL CO., LTD.). Food materials in a liquid state at room temperature are preferable from the viewpoint of convenience. Food materials containing edible fats/oils among the insoluble dietary fiber-containing food materials and other food materials described hereinbefore can also be used for such a purpose. These food materials may be used singly, or two or more may be used together in any combination.

It is preferable, however, to add extracted and purified edible fats/oils separately from food materials to enhance the compatibility of food materials regardless of whether insoluble dietary fiber-containing food materials and other food materials contain fats/oils. Specifically, it is preferable that typically 10 mass % or more and additionally 30 mass % or more of the total fat/oil content contained in the composition of one or more embodiments be derived from extracted and purified edible fats/oils.

The composition of one or more embodiments contains a certain value or less of the total fat/oil content to preferably form fine particle composites. The total fat/oil content in the composition herein means a content of fat/oil derived from all components of all food materials contained in the composition. Specifically, it is preferable that the upper limit of total fat/oil content in the composition of the present invention be typically less than 20 mass %, additionally less than 15.5 mass % and further less than 10.5 mass %. On the other hand, the lower limit of total fat/oil content in the composition of one or more embodiments is not limited and, from the viewpoint of readily forming fine particle composites to be described hereinafter in the composition, it is preferable that the lower limit be typically 0.1 mass % or more, further 0.2 mass % or more and additionally 0.3 mass % or more to form fine particles.

[Seasoning and Food Additives]

The composition of one or more embodiments may contain any one or more seasonings and food additives. Examples of the seasoning and food additive include soy sauce, miso, alcohol, saccharides (for example, glucose, sucrose, fructose, glucose fructose corn syrup and fructose glucose corn syrup), sugar alcohols (for example, xylitol, erythritol and maltitol), artificial sweeteners (for example, sucralose, aspartame, saccharine and acesulfame K), minerals (for example, calcium, potassium sodium, iron, zinc and magnesium, and salts thereof), aromas, pH adjusting agents (for examples, sodium hydroxide, potassium hydroxide, lactic acid, citric acid, tartaric acid, malic acid and acetic acid), cyclodextrin, antioxidants (for example, vitamin E, vitamin C, tea extracts, raw coffee bean extracts, chlorogenic acid, spice extracts, caffeic acid, rosemary extracts, vitamin C palmitate, rutin, quercetin, red bayberry extracts and sesame extracts), emulsifiers (for example, glycerol esters of fatty acids, monoglyceride acetates, monoglyceride lactates, monoglyceride citrate, monoglyceride diacetyl tartrate, monoglyceride succinate, polyglycerol esters of fatty acids, polyglycerol esters of condensed ricinoleic acid, quillaja extracts, soybean saponin, tea seed saponin and sucrose esters of fatty acids), coloring agents and thickening stabilizers.

However, considering recent awareness, it is preferable that the composition of one or more embodiments does not contain so-called emulsifiers and/or coloring agents and/or thickening stabilizers (for example, those described as "coloring agent", "thickening stabilizer" and "emulsifier" in the "Food additive list for labelling" of the Food additive labelling handbook (edition of 23rd year of the Heisei). Of these, from the viewpoint of achieving the quality in which the taste of a material is easily sensed, it is preferable that the composition of one or more embodiments does not contain an emulsifier. It is further desirable that the composition of one or more embodiments does not contain food additives (e.g., substances described in the "Food additive list for labelling" of the Food additive labelling handbook (edition of the 23rd year of the Heisei) used for the purpose of food additives). From the viewpoint of achieving sweetness of a food product itself which is easily sensed, it is preferable not to add saccharides (glucose, sucrose, fructose, glucose fructose corn syrup and fructose glucose corn syrup). The composition of one or more embodiments may be an embodiment free from acetic acid because the taste of this material is easily sensed.

[Water]

It is preferable that the composition of one or more embodiments contain water. The water in the composition may be those derived from various components of the composition described hereinbefore but further water may be added. In one or more embodiments, the water content in the composition means the total of the water content derived from various components of the composition and the water content separately added.

Specifically, it is preferable that a mass ratio of the water content to the whole composition be typically 35 mass % or more, additionally 45 mass % or more, further 50 mass % or more and furthermore 55 mass % or more. When a mass ratio of the water content to the whole composition is the lower limit or more, it is easy to control the formation of fine particle composites. The upper limit of the mass ratio of the water content is not limited and it is convenient for better industrial productivity, to be typically 98 mass % or less, further 96 mass % or less and additionally 90 mass % or less.

In the composition of one or more embodiments, it is better to use a percentage of water content to the sum of the water content and the total fat/oil content, that is, a value of "water content/(water content+total fat/oil content)", of 75% or more, further 80% or more and more preferably 85% or more to form fine particle composites. The upper limit of the value of the "water content/(water content+total fat/oil content)" is not limited and, from the viewpoint of readily forming fine particle composites to be described hereinafter in the composition, it is preferable to be typically 100 mass % or less.

[Fine Particle and Fine Particle Composite]

In the composition of one or more embodiments, insoluble dietary fibers are present in the form of fine particles. The fine particles may be formed from one or more insoluble dietary fibers only but may also be formed from one or more insoluble dietary fibers in combination with one or more other components.

In the composition of one or more embodiments, multiple fine particles containing insoluble dietary fibers described above agglomerate and form composites which can be disintegrated by disturbance. That is, the composition of one or more embodiments contains composites of fine particles containing insoluble dietary fibers. When the composition of one or more embodiments contains insoluble dietary fibers in such a composite state, the water separation of the composition can be controlled and the resulting composition has an improved texture, is easily consumable and becomes more compatible with other food products. In one or more embodiments, a typical example of the disturbance from outside for disintegrating fine particle composites is supposed to be ultrasonication, unless otherwise specified. The "ultrasonication" in one or more embodiments represents, unless otherwise specified, application treatment to a measurement sample by ultrasound having a frequency of 40 kHz with an output of 40 W for 3 minutes.

The composition of one or more embodiments contain composites of fine particles containing insoluble dietary fibers, and has the shape and size of fine particle composites adjusted to the ranges to be described hereinafter before and after applying disturbance to provide a composition having various advantageous characteristics such as stability enhancement (prevention from dryness) and emulsification capacity enhancement of the composition. The cause thereof is unknown but it is conceived that composites in distinctive shapes as if multiple dietary fibers were twisted together are formed in the composition and these composites demonstrate various effects. In recent years, studies on microrefinement technology has been actively conducted in various fields including the food field, but the properties provided by the shape of secondary structure (composite) formed by agglomeration of microrefined fine particles have not been studied in depth. It is not well known that the shape and size of such fine particle composites, when adjusted, can provide previously unknown various effects.

[Particle Size in the Composition]

The composition of one or more embodiments satisfies the following specific requirements on various parameters regarding the particle sizes of fine particle composites and fine particles contained in the composition before and after disturbance, that is, a maximum particle size, a modal particle size and a particle size d50. That is, the composition of one or more embodiments contains a large number of fine particle composites in the state of not applying disturbance, that is, the state before ultrasonication, whereas in the state of applying disturbance, that is, the state after ultrasonication, a part or all of the fine particle composites are disrupted to be single fine particles, whereby various parameters regarding particle sizes such as not only the maximum particle size but also the modal particle size and the particle size d50 drastically change after ultrasonication.

The maximum particle size of fine particle composites before disturbance of the composition of one or more embodiments is adjusted to within a predetermined range. Specifically, the maximum particle size before disturbance in the composition of one or more embodiments, that is, before ultrasonication, is typically 100 µm or more. It is additionally preferable to be 110 µm or more. When the maximum particle size of the composition before ultrasonication is the lower limit or more, an unfavorable flavor is prevented from being imparted due to the tissue disruption of a food material. On the other hand, the maximum particle size of the composition of one or more embodiments before disturbance, that is, before ultrasonication, is not limited and it is preferable to be typically 2,000 μm or less and additionally 1,500 μm or less. When the maximum particle size of the composition before ultrasonication is the upper limit or less, it is convenient from the viewpoint of industrial productivity.

The maximum particle size of fine particle composites after disturbance of the composition of one or more embodiments is adjusted to within a predetermined range. Specifically, it is preferable that the minimum particle size after disturbance of the composition of one or more embodiments, that is, after ultrasonication, be typically 20 μm or more and additionally 30 μm or more. When the maximum particle size of the composition after ultrasonication is the lower limit or more, an unfavorable flavor is prevented from being imparted due to the tissue disruption of a food material, which is preferable. Meanwhile, the maximum particle size of the composition of one or more embodiments after disturbance, that is, after ultrasonication, is not limited and it is preferable to be typically 1,100 μm or less and additionally preferable to be 800 μm or less. When the maximum particle size of the composition after ultrasonication is the upper limit or less, it is convenient from the viewpoint of industrial productivity.

The composition of one or more embodiments is a turbid system which thus makes it difficult to visually discriminate accurately the maximum particle size, but at least the lower limit value of the maximum particle size can be roughly visually determined. That is, when a maximum particle size observed by using a microscope is larger than a certain value, an actual maximum particle size is considered to have a high probability of being also larger than the certain value.

The modal particle size (modal diameter) of fine particle composites before disturbance of the composition of one or more embodiments is adjusted to within a predetermined range. Specifically, it is preferable that the modal particle size before disturbance of the composition of one or more embodiments, that is, before ultrasonication, be typically 5 μm or more. It is additionally preferable to be 10 μm or more and further 12 μm or more. When the modal particle size of the composition before ultrasonication is the lower limit or more, the composition has a quality which is less likely to undergo syneresis and thus preferable from the viewpoint of commercial distribution. On the other hand, the modal particle size before disturbance of the composition of one or more embodiments, that is, before ultrasonication, is typically 400 μm or less. It is preferable to be additionally 300 μm or less, further 200 μm or less and furthermore 100 μm or less. When the modal particle size of the composition before ultrasonication is the upper limit or less, the texture is prevented from being deteriorated and thus suitable texture and feel at eating can be imparted to the composition.

The modal particle size of fine particle composites in the composition of one or more embodiments after disturbance is also adjusted to within a predetermined range. Specifically, the modal particle size after disturbance of the composition of one or more embodiments, that is, after ultrasonication, is typically 0.3 μm or more. It is preferable to be additionally 1.0 μm or more, further 3.0 μm or more, furthermore 5.0 μm or more and particularly 7.0 μm or more. When the modal particle size of the composition after ultrasonication is the lower limit or more, the composition is less likely to dry and thus it can be stored for a long period of time, which is preferable. Meanwhile, the modal particle size after disturbance of the composition of one or more embodiments, that is, after ultrasonication, is typically 100 μm or less. It is preferable to be additionally 90 μm or less, further 80 μm or less, furthermore 70 μm or less, or 60 μm or less and particularly 50.0 μm or less. When the modal particle size of the composition after ultrasonication is the upper limit or less, the texture is prevented from being deteriorated and thus suitable texture and feel at eating can be imparted to the composition.

The modal particle diameter in one or more embodiments represents a particle size of a channel having the highest particle frequency % when a particle size distribution of each channel is obtained by measuring the composition using a laser diffraction particle size distribution analyzer. When there are multiple channels with exactly the same particle frequency %, the particle size of a channel having the smallest particle size among them is employed. When a particle size distribution is normal, the value thereof corresponds to the median size thereof but when there is a shift in a particle distribution, particularly when there are multiple peaks in a particle distribution, numerical values substantially vary. The particle size distribution measurement of a sample using a laser diffraction particle size distribution analyzer can be carried out by, for example, the following method. When a sample is a thermoplastic solid, the sample may be liquefied by heat treatment before subjecting to the analysis by a laser diffraction particle size distribution analyzer.

In addition to the above maximum particle diameter and modal particle diameter, the particle diameter d50 (50% cumulative diameter, median particle size, median size) of fine particle composites before and after disturbance of the composition of one or more embodiments is also preferably adjusted to within a predetermined range. Specifically, it is preferable that a particle size d50 of the composition of one or more embodiments before disturbance, that is, before ultrasonication, be typically 5 μm or more, additionally 10 μm or more, and typically 400 μm or less, additionally 300 μm or less, further 250 μm or less and additionally 200 μm or less. It is preferable that a particle size d50 of the composition of one or more embodiments after disturbance, that is, after ultrasonication, be typically 1 μm or more, additionally 5 μm or more and further 7 μm or more, and typically 150 μm or less, additionally 100 μm or less and further 75 μm or less. The particle size d50 of the composition is defined as the particle size at which, when a particle size distribution of the composition is divided into 2 groups at a certain particle size, a ratio of a proportion of the cumulative value of particle frequency % on the larger side to a proportion of the cumulative value of particle frequency % on the smaller side is 50:50. The particle size d50 of the composition can be measured by using, for example, a laser diffraction particle size distribution analyzer to be described hereinafter.

The "particle sizes" in one or more embodiments are measured on a volumetric basis, unless otherwise specified. The "particle" in the present invention is a concept, unless otherwise specified, which can encompass not only a single fine particle but a fine particle composite composed of agglomeration of such fine particles.

We now describe the measurement conditions for various parameters regarding the particle sizes of one or more embodiments, which are not limited and can be the following conditions. Any solvent can be used during the measurement as long as it does not affect the structure of the insoluble dietary fibers in the composition. As an example, distilled water is preferably used. A laser diffraction particle size distribution analyzer used for the measurement is not limited and, for example, a Microtrac MT3300EXII system of MicrotracBEL Corp. can be used. An application software for the measurement is not limited and, for example, DMS2 (Data Management System version 2, MicrotracBEL Corp.) can be used. When the measurement apparatus and software described above are used, press down WASH button of the software to carry our washing, then press down SET ZERO button of the software to carry out zero adjustment, and a sample is directly loaded at SAMPLE LOADING until a concentration of the sample reaches an appropriate range for the measurement. A sample before disturbance, that is, a sample which is not ultrasonicated, is adjusted to a concentration within an appropriate range in 2 sample loadings after sample loading and then immediately subjected to laser diffraction at a flow rate of 60% and a measurement time of 10 seconds to use a result as a measured value. Meanwhile, when a sample after disturbance, that is, an ultrasonicated sample, is measured, a sample ultrasonicated in advance may be loaded or ultrasonication is carried out by using the above measurement apparatus after a sample is loaded and subsequently the measurement may be carried out. In the latter case, a sample which has not been subjected to ultrasonication is loaded and adjusted to a concentration within an appropriate range at SAMPLE LOADING and subsequently ultrasonication is carried out by pressing down ULTRASONICATION BUTTON of the software. Thereafter, defoaming treatment was carried out three times, the sample loading treatment is carried out again, the concentration is confirmed to have been still within the appropriate range and subsequently laser diffraction is carried out at a flow rate of 60% and a measurement time of 10 seconds to use a result as a measured value. Parameters at the measurement include, for example, distribution mode: volume, particle refractive index: 1.60, solvent refractive index: 1.333, measurement upper limit (μm)=2,000.00 μm and measurement lower limit (μm)=0.021 μm.

When various particle sizes of the composition in one or more embodiments are determined, it is preferable that a particle size distribution of each channel (CH) be measured and then a particle size of each measurement channel shown in Table 2 to be described hereinafter be used as the standard for determination. Specifically, frequencies of the particles having a particle size or less than those specified in each channel of Table 2 to be described hereinafter and also having a particle size larger than those specified in a channel having a number greater by one (the maximum channel in the measurement range uses the measurement lower limit particle size) are measured by each channel of Table 2 to be described hereinafter, whereby the particle frequency % of each channel can be determined by using the total frequency of all channels within the measurement range as the denominator (this is also called "particle frequency % of XX channel). For example, the particle frequency % of Channel 1 represents the frequency % of particles which are 2,000.00 μm or less and larger than 1,826.00 μm. Particularly, the maximum particle size can be determined as a particle size of the channel having the largest particle size among the channels in which the particle frequencies % are detected as the results obtained by measuring a particle frequency % of each of 132 channels of Table 2 to be described hereinafter. In other words, when the maximum particle size of the composition in one or more embodiments is measured by using a laser diffraction particle size distribution analyzer, preferable measurement conditions therefore use distilled water as the measurement solvent and a particle size is readily measured after loading a sample which is a target from the measurement upper limit of 2,000.00 μm and the measurement lower limit of 0.021 μm.

[Particle Specific Surface Area in the Composition]

It is preferable that, in addition to the above various requirements, the composition of one or more embodiments satisfies the following requirement on the specific surface area per unit volume of particles (fine particles and fine particle composites) in the composition before and after applying disturbance, that is, before and after ultrasonication. That is, the composition of one or more embodiments contains a large number of fine particle composites in the state of not applying disturbance, that is, the state before ultrasonication, whereas in the state of applying disturbance, that is, the state after ultrasonication, a part or all of the fine particle composites are disrupted to be single fine particles, whereby the specific surface area per unit volume thereof also drastically changes after ultrasonication from that therebefore.

That is, it is preferable that a specific surface area per unit volume of particles (fine particles and fine particle composites) in the composition before applying disturbance ($\gamma_B$), that is, before ultrasonication, be typically 1.00 m$^2$/mL or less and additionally 0.80 m$^2$/mL or less. When such a specific surface area ($\gamma_B$) is the upper limit or less, fine particles form enough composites thereby to provide sufficient stability enhancement effect of one or more embodiments, which is preferable. The lower limit of such a specific surface area ($\gamma_B$) is not limited and it is preferable to range from, typically 0.07 m$^2$/mL or more, additionally 0.10 m$^2$/mL or more to further 0.15 m$^2$/mL or more to enhance stability of the composition.

It is preferable that a specific surface area per unit volume of particles in the composition (fine particles and fine particle composites) after applying disturbance ($\gamma_A$), that is, after ultrasonication, be typically 1.70 m$^2$/mL or less, further 1.50 m$^2$/mL or less, further 1.30 m$^2$/mL or less, further 1.10 m$^2$/mL or less and additionally 0.80 m$^2$/mL or less. When such a specific surface area ($\gamma_A$) is the upper limit or less, fine particles form enough composites thereby to provide sufficient stability enhancement effect of one or more embodiments, which is preferable. The lower limit of such a specific surface area ($\gamma_A$) is not limited and it is preferable to range from typically 0.07 m$^2$/mL or more, additionally 0.10 m$^2$/mL or more, further 0.15 m$^2$/mL or more to additionally 0.20 m$^2$/mL or more for better stability.

It is preferable that a ratio of specific surface areas per unit volume of particles (fine particles and fine particle composites) in the composition before and after applying disturbance, that is, before and after ultrasonication, that is ($\gamma_B/\gamma_A$), satisfy a predetermined range. Specifically, it is preferable for ($\gamma_B/\gamma_A$) to be typically 0.80 or less. When a $\gamma_B/\gamma_A$ is the upper limit or less, dietary fibers are favorably in the form of composites thereby to suitably exhibit the stability enhancement effect of the composition, which is preferable. The lower limit of ($\gamma_B/\gamma_A$) is not limited and it is preferable to be typically 0.1 or more.

In one or more embodiments, the specific surface area per unit volume of the composition represents a specific surface area per unit volume (1 mL) when particles measured by using a laser diffraction particle size distribution analyzer are assumed to be spherical. The specific surface area per unit volume when particles are assumed to be spherical is a numerical value based on a measurement mechanism different from measured values reflecting components and surface structure of particles (a specific surface area per volume and per mass determined by permeability method or gas adsorption method). The specific surface area per unit volume when particles are assumed to be spherical is determined by, when a surface area per particle is ai and a particle size is di, $6 \times \Sigma(ai)/\Sigma(ai \cdot di)$.

[Morphological Characteristics in the Composition]

The composition of one or more embodiments satisfies at least one, preferably two or more and more preferably all three of the following requirements (1) to (3), which specify the form of fine particles containing insoluble dietary fibers and fine particle composites.

<Requirement (1): Numerical Value N(I)>

Requirement (1) requires a numerical value N(I) determined by the following formula (I) to be a predetermined value or more.

(Expression 1)

$$N(I)=(\alpha/\beta) \qquad (I)$$

wherein
α represents a 90 percentile value of a "long diameter" before ultrasonication measured by a particle shape image analyzer, and
β represents a 90 percentile value of a "short diameter" before ultrasonication measured by a particle shape image analyzer.

In other words, the fine particle composite-containing composition which satisfies the requirement (1), that is, the numerical value N(I) is a predetermined value or more, means to dominantly contain fine particles having morphological characteristic with a long diameter being longer than a short diameter (elongated) and a proportion thereof is higher than a typical composition.

Specifically, according to the requirement (1), it is preferable that the numerical value N(I) be typically 1.20 or more, additionally 1.30 or more, further 1.40 or more and furthermore 1.50 or more. When the numerical value N(I) is the lower limit or more, the emulsification capacity of the composition is enhanced and an effect of improving the astringent taste thereof is also obtained, which is preferable.

The upper limit of the numerical value N(I) is not limited and it is preferable to be, typically 4.0 or less and additionally 3.0 or less for a more convenient production.

When microrefinement treatment is carried out until the numerical value N(I) increases by 5% or more after microrefinement from that therebefore, an effect of improving the astringent taste of the composition is recognized, which is preferable, and it is further preferable to carry out the microrefinement treatment until such a value increases by 10% or more, it is additionally preferable to carry out the microrefinement treatment until such a value increases by 15% or more and it is most preferable to carry out the microrefinement treatment until such a value increases by 20% or more. That is, the effects such as the astringent taste improvement are notably recognized when the composition is in the state of being microrefined until the numerical value N(I) increases by 5% or more after microrefinement from that therebefore. For example, when the numerical value N(I) of the composition before media agitating mill treatment (equivalent to Test Examples 10, 15 and 25 to be described hereinafter) is, for example, 1.24 (Test Example 10) and the numerical value N(I) of the composition after microrefinement treatment using a media agitating mill corresponding thereto (equivalent to Test Examples 11 to 13, 16 to 18, 26 to 28 to be described hereinafter) is, for example, 1.54 (Test Example 11), microrefinement treatment is considered to have been carried out until the numerical value N(I) increases by about 24%.

<Requirement (2): Numerical Value N(II)>

Requirement (2) requires a numerical value N(II) determined by the following formula (II) to be a predetermined value or more.

(Expression 2)

$$N(II)=(\alpha/\beta)/\omega \qquad (II)$$

wherein
α represents a 90 percentile value of a "long diameter" before ultrasonication measured by a particle shape image analyzer,
β represents a 90 percentile value of a "short diameter" before ultrasonication measured by a particle shape image analyzer, and
ω represents a 10 percentile value of a "degree of unevenness" before ultrasonication measured by a particle shape image analyzer.

In other words, the fine particle composite-containing composition which satisfies the requirement (2), that is, the numerical value N(II) is a predetermined value or more, means to dominantly contain fine particles having morphological characteristics with a long diameter being longer than a short diameter (elongated) and the particle surface being uneven and a proportion thereof is higher than a typical composition.

Specifically, according to the requirement (2), it is preferable that the numerical value N(II) be typically 1.40 or more, additionally 1.50 or more, furthermore 1.60 or more, and further 1.70 or more, or 1.80 or more, or 1.90 or more and particularly 2.00 or more. When the numerical value N(II) is the lower limit or more, the emulsification capacity of the composition is enhanced and an effect of improving the astringent taste thereof is also obtained, which is preferable.

The upper limit of the numerical value N(II) is not limited and it is preferable to be typically 4.0 or less and additionally 3.0 or less for a more convenient production.

When microrefinement treatment is carried out until the numerical value N(II) increases by 5% or more after microrefinement from that therebefore, the resulting improvement of the astringent taste of the composition is recognized, which is preferable, and it is further preferable to carry out the microrefinement treatment until such a value increases by 10% or more, it is additionally preferable to carry out the microrefinement treatment until such a value increases by 20% or more and it is most preferable to carry out the microrefinement treatment until such a value increases by 30% or more. That is, the effects such as the astringent taste improvement are notably recognized when the composition is in the state of being microrefined until the numerical value N(II) increases by 5% or more after microrefinement from that therebefore. For example, when the numerical value N(II) of the composition before media agitating mill treatment (equivalent to Test Examples 10, 15 and 25 to be described hereinafter) is, for example, 1.43 (Test Example 10) and the numerical value N(II) of the composition after microrefinement treatment using a media agitating mill corresponding thereto (equivalent to Test Examples 11 to 13, 16 to 18, 26 to 28 to be described hereinafter) is, for example, 2.34 (Test Example 11), microrefinement treatment is considered to have been carried out until the numerical value N(II) increases by about 63%.

<Requirement (3): Numerical Value N(III)>

Requirement (3) requires a numerical value N(III) determined by the following formula (III) to be a predetermined value or more.

(Expression 3)

$$N(III) = (\alpha/\beta) \times \gamma_A \quad (III)$$

wherein $\alpha$ represents a 90 percentile value of a "long diameter" before ultrasonication measured by a particle shape image analyzer, $\beta$ represents a 90 percentile value of a "short diameter" before ultrasonication measured by a particle shape image analyzer, and $\gamma_A$ represents a specific surface area per unit volume after ultrasonication.

In other words, the fine particle composite-containing composition which satisfies the requirement (3), that is, the numerical value N(III) is a predetermined value or more, means to dominantly contain fine particles having morphological characteristics with a long diameter being longer than a short diameter (elongated) and a specific surface area per unit volume being large after agglomeration is disrupted by ultrasonication and a proportion thereof is higher than a typical composition.

Specifically, according to the requirement (3), it is preferable that the numerical value N(III) be typically 0.50 or more, additionally 0.60 or more, furthermore 0.70 or more, and further 0.80 or more, or 0.90 or more and particularly 1.00 or more. When the numerical value N(III) is the lower limit or more, the emulsification capacity of the composition is enhanced and an effect of improving the astringent taste thereof is also obtained, which is preferable.

The upper limit of the numerical value N(III) is not limited and it is preferable to be typically 4.0 or less and additionally 3.0 or less for a more convenient production.

When microrefinement treatment is carried out until the numerical value N(III) increases by 5% or more after microrefinement from that therebefore, an effect of improving the astringent taste of the composition is recognized, which is preferable, and it is further preferable to carry out the microrefinement treatment until such a value increases by 10% or more, it is further preferable to carry out the microrefinement treatment until such a value increases by 20% or more, it is additionally preferable to carry out the microrefinement treatment until such a value increases by 30% or more and it is most preferable to carry out the microrefinement treatment until such a value increases by 40% or more. That is, the effects such as the astringent taste improvement are notably recognized when the composition is in the state of being microrefined until the numerical value N(III) increases by 5% or more after microrefinement from that therebefore. For example, when the numerical value N(III) of the composition before media agitating mill treatment (equivalent to Test Examples 10, 15 and 25 to be described hereinafter) is, for example, 0.54 (Test Example 10) and the numerical value N(III) of the composition after microrefinement treatment using a media agitating mill corresponding thereto (equivalent to Test Examples 11 to 13, 16 to 18, 26 to 28 to be described hereinafter) is, for example, 1.31 (Test Example 11), microrefinement treatment is considered to have been carried out until the numerical value N(III) increases by about 142%.

<Measurement Method of Morphological Requirement>

In one or more embodiments, measurements of various parameters to calculate the N(I) to N(III) described herein-before, that is, the measurement of a long diameter, a short diameter and a degree of unevenness of the particles (fine particles and fine particle composites) in the composition, can be carried out by planar image analysis using a particle shape analyzer. As an example, the following technique is preferably carried out because accurate morphological characteristics of a fine particle image can be comprehended. That is, it is preferable that, to use a common particle shape analyzer having a function capable of photographing an individual particle image and analyzing the shape thereof, for example, the composition in the form of a granular suspension be injected into a flow cell and fine particle composites coming in the photographing view are automatically discriminated to comprehend and analyze the morphological characteristics thereof. It is herein preferable to use a particle shape analyzer capable of randomly selecting fine particle composites and automatically obtaining a large amount of individual particle information in a short time. Specifically, it is preferable to use an apparatus for analyzing particles by a dynamic image analysis method, which is a particle analyzer to which a high-pixel camera is mountable (e.g., PITA-4 manufactured by SEISHIN ENTERPRISE Co., Ltd.).

Specifically, photographing particles (fine particles and fine particle composites) in the composition can be carried out by using a camera capable of photographing detailed images of particles. It is preferable to use an imaging camera (CCD camera or C-MOS camera) capable of photographing more detailed planar images than the number of effective pixels of at least about 1,920 (H)×1,080 (V) and pixel size of 2.8 μm×2.8 μm. Examples of such an imaging camera include DMK33UX290 (manufactured by The Imaging Source). Conditions for image photographing usable are, for example, as follows. That is, an objective lens with a magnification of 4× is used when photographing images and fine particles images are photographed while injecting a sample at a suitable flow rate. Particularly, for the shape of a flow cell, when a planar extension cell which enhances a planar extension effect and allows the center of most composites in the composition before ultrasonication to pass through within a focus range of a lens is used, accurate morphological characteristics can be comprehended. When photographing images, conditions of a particle image analyzer are set in such a way that the focus is suitably set, particle shapes can be clearly confirmed and a contrast against backdrop can obviously discriminate composites in the composition before ultrasonication from the backdrop. Examples of setting various parameters at capturing images, when an 8-bit grayscale imaging camera (0 is black, 255 is white) is used, planar images are captured at an LED intensity of 100 and a camera gain of 100 db and subsequently a brightness level of particle images present therein can be 115 and a contour level of the images can be 160. A solvent and a carrier solution suitable at measurement can be any solvent as long as it does not affect the form of fine particle composites within the composition but, as an example, distilled water is preferable. For example, a sample is diluted to 1,000-fold with a solvent used at measurement, injected into a cell for particle image measurement (synthetic quartz glass) and subjected to the fine particle composite shape image analysis. Image photographing are carried out as planar images (pixel size 2.8 μm×2.8 μm) of, for example, 1,920 pixels×1,080 pixels and can be continued until the number of particles to be photographed reaches, for example, 10,000 specimens. When a focus is not suitably adjusted on images to be photographed, the shape thereof cannot be accurately measured, so photographing must be carried out with a focus sharply on images to be photographed. Setting of photographing conditions may vary by photoshooting, so it is desirable that suitable conditions be adjusted at every photo shooting before photographing is carried out again.

Image analysis of the particles (fine particles and fine particle composites) in the photographed composition can be carried out by, for example, the following procedure. That is, for fine particle images having a minimum pixel number of 15 pixels or more present in the planar images, 10,000 images are respectively measured for a long diameter, a short diameter and a degree of unevenness, and 90 percentile values of the 10,000 specimens are employed for the long diameter and short diameter and a 10 percentile value of the 10,000 specimens is employed for the degree of unevenness. In one or more embodiments, the "percentile value" means a value located at any % when rearranging the distribution of measured values from smaller numbers to larger numbers and counting from the smaller side. For examples, a 90 percentile value of any measured value when 10,000 fine particle images are measured refers to the 9,000th measured value by counting from the smallest measured value of all fine particle images.

In one or more embodiments, the "long diameter" and "short diameter" of particles (fine particles and fine particle composites) in the composition can be decided based on a particle shape formed by connecting vertically, laterally or diagonally adjacent pixels on a particle image. That is, the "long diameter" of a particle represents the maximum distance between 2 points on a border line of the above particle shape on the particle image thereof, and the "short diameter" of the particle represents, in the above particle shape of the particle image thereof, the shortest distance when 2 straight lines parallel with a line along with the above maximum distance interpose the above particle shape. That is, the larger the number of fine particles or fine particle composites distinctively having specific morphological characteristics such as an elongated morphological characteristic, the tendencies thereof are reflected on the respective 90 percentile values, which represent the dominant characteristics of the long diameter and the short diameter of the composition, whereby a N(I) (that is, 90 percentile value of long diameter ($\alpha$)/90 percentile value of short diameter (($\beta$)) becomes larger.

In one or more embodiments, the "degree of unevenness" of particles (fine particles and fine particle composites) in the composition is a value representing the degree of unevenness of the above particle shape on the particle image thereof and determined by (circumference length when tops of the bump parts of the above particle shape on the particle image thereof are joined by the shortest distance)/(contour length of the above particle shape on the particle image thereof). That is, the larger the number of particles distinctively having specific morphological characteristics such as having many unevenness on the particle surface, the tendency thereof is reflected on the 10 percentile value of degree of unevenness, which reflects the overall characteristic of the composition in the state of applying disturbance, that is, the composition after ultrasonication. Specifically, the larger the numbers of particles having an elongated morphological characteristic and also having unevenness on the particle surface, those tendencies are reflected on the 90 percentile values which represent the dominant characteristics of the long distance and the short distance of the composition and the 10 percentile value of degree of unevenness, whereby the numerical value N(II) (that is, {[90 percentile value of long diameter ($\alpha$)]/[90 percentile value of short diameter ($\beta$)]}/[10 percentile value of degree of unevenness ($\omega$)]) consequently becomes larger.

[Content of Fine Particle Composites]

In the composition of one or more embodiments, it is preferable that the content of fine particles containing insoluble dietary fibers and fine particle composites satisfy a predetermined range. Specifically, it is preferable that a mass percentage of fine particles and fine particle composites to the whole composition be typically 4 mass % or more, additionally 6 mass % or more, further 8 mass % or more, more preferably 9 mass % or more and particularly 10 mass % or more. When the mass percentage is the lower limit value or more, the taste containing insoluble dietary fibers can be sufficiently perceived, which is preferable. On the other hand, it is preferable that the upper limit of the mass percentage be typically 98 mass % or less, additionally 91 mass % or less, further 85 mass % or less, furthermore 80 mass % or less and particularly 55 mass % or less. When the mass percentage is the upper limit value or less, food materials containing insoluble dietary fibers can be easily consumed, which is preferable. When the fine particle composite is a composite of food product fine particles, the taste is more easily perceived, which is preferable, and a composite of dietary fiber-containing food product fine particles is the most preferable.

In one or more embodiments, the content of fine particles and fine particle composites in the composition can be measured by, for example, the following procedure. That is, a mass of the components, which is obtained by excluding food products and the like larger than 2,000 μm (2 mm) and thus are not measurement targets for the laser diffraction particle size distribution measurement or particle shape image analyzer from the total mass of insoluble components in the composition, is measured. Herein, when the composition contains food products and the like larger than 2 mm, for example, a mass of precipitated fraction, which is obtained by passing the composition through a 9-mesh (opening 2 mm) and centrifuging the fraction thereof to thoroughly remove the separated supernatant therefrom, is considered to be a content of fine particles and fine particle composites in the composition (specifically, for solid fats/oils, food products and the like larger than 2 mm are removed as necessary while in the state of being dissolved by heating, subsequently centrifugation is carried out to remove the separated supernatant). A part of fats/oils and water are taken into the precipitated fraction, and hence the total mass of fine particles and fine particle composites in the composition represents the total mass of these components taken into the precipitated fraction and the food material.

More specifically, in one or more embodiments, the content of fine particles and fine particle composites in the composition can be measured by, for example, the following procedure. That is, for example, any amount of the composition is allowed to pass through the 9-mesh (Tyler mesh), followed by centrifuging the passed fraction at 15,000 rpm for 1 minute and measuring a precipitated fraction mass from which the separated supernatant has been thoroughly removed thereby to measure a content of fine particles and fine particle composites in the composition. The residue on the mesh when allowing the composition to pass through the 9-mesh is allowed to thoroughly stand and subsequently insoluble dietary fiber-containing fine particles smaller than the opening of the 9-mesh are allowed to thoroughly pass through using a spatula or the like so that the particle size of the composition remains unchanged thereby to obtain a passed fraction. For the composition having a flowability low enough not to pass through the 9-mesh (for example, a physical property having a Bostwick viscosity of 10 cm or less at 20° C. for 30 seconds), the composition which has been allowed to pass through the 9-mesh in the state of being diluted to about 3-fold with a solvent such as an olive oil is centrifuged thereby to measure a content of insoluble dietary fiber-containing fine particles in the composition. For a thermoplastic composition, the composition, in the state of being imparted with flowability by heating and diluted to about 3-fold with a solvent such as water, is allowed to pass through the 9-mesh and subsequently centrifuged thereby to measure a content of insoluble dietary fiber-containing fine particles in the composition.

The composition of one or more embodiments before applying disturbance, that is, in the state of before ultrasonication, preferably contains a predetermined number or more of fine particles or fine particle composites having particle sizes within a predetermined range. Specifically, it is preferable to contain typically 10,000 particles/cm$^3$ or more, additionally 10,000 particles/cm$^3$ or more, further 1,000,000 particles/cm$^3$ or more of fine particles or fine particle composites having particle sizes from 2.3 μm to 1,600 μm to be measurement targets for the particle shape image analyzer. When the contained number of fine particles or fine particle composites having particle sizes within the above predetermined range is less than the lower limit, the effects of one or more embodiments are not sufficiently demonstrated, hence not preferable. The contained number of fine particles or fine particle composites having particle sizes within the above predetermined range can be measured by using planar particle image analysis (PITA-4) by a particle shape analyzer as described above as an example in the technique for analyzing morphological characteristics of particles in the composition.

[Production Method of the Composition]

A method for preparing the composition of one or more embodiments is not limited; any technique can be used as long as a composition satisfying the above various requirements can be obtained. Specifically, ingredients for the composition of one or more embodiments, for example, insoluble dietary fiber-containing food materials as well as any other food materials used, edible fats/oils, seasonings and other components may be mixed. However, a method preferably includes a microrefinement treatment step of insoluble dietary fiber-containing food materials in the presence of edible fats/oils and other food materials and components as necessary. When insoluble dietary fiber-containing food materials are thus microrefined, composites of fine particles containing insoluble dietary fibers are easily formed. The reason why composites of fine particles are formed by such a microrefinement treatment is unknown, but when insoluble dietary fiber-containing food materials are microrefined, it is possible that fine particles containing insoluble dietary fibers are formed and multiple such fine particles come together and re-agglomerate to form composites having the above special shape characteristics. The formation of composites by the agglomeration of fine particles can be facilitated particularly when a certain amount of water or fats/oils coexiste, a high shear force is applied, or pressure applying conditions and temperature increasing conditions are applied. The formation of composites having specific configuration properties by the re-agglomeration of fine particle composites under such conditions and various useful effects described hereinbefore can be obtained by such a formation of composites have not been known at all up to date.

A means for the microrefinement treatment used in one or more embodiments is not particularly limited. The temperature during microrefining is not also limited and may be any of high-temperature grinding, room-temperature grinding or low-temperature grinding. The pressure during microrefining is not also limited and may be any of high-pressure grinding, normal-pressure grinding or low-pressure grinding. However, in order to obtain the composition containing fine particles and fine particle composites in a shape specified in one or more embodiments, a means is preferably those capable of treating food materials and other components, i.e., the ingredients for the composition, in a short time using a high shear force under pressure applying conditions and temperature increasing conditions. Examples of the apparatus for such a microrefinement treatment include apparatuses such as blenders, mixers, mills, kneaders, grinders, disintegrators, abrasioners and any of these may be used. The system at microrefining may be either dry grinding or wet grinding. For dry microrefinement, examples of the apparatus usable include media agitating mills such as dry bead mills, ball mills (roll system, vibration system and the like), jet mills, high-speed rotation type impact mills (pin mill and the like), roll mills and hammer mills. For wet microrefinement, examples of the apparatus usable include media agitating mills such as bead mills and ball mills (roll system, vibration system, planetary mills and the like), roll mills, colloid mills, star burst and high-pressure homogenizer. Of these, media agitating mills (ball mills and bead mill) or high-pressure homogenizer is preferable, and media agitating mills are more preferable. Of these, it is preferable to use a wet media agitating mill, particularly a wet bead mill. When a wet media agitating mill is used, the water in the composition, when a food product composition is left to stand, is less likely to dry in comparison with other microrefinement treatment methods thereby to provide a quality with high stability, which is preferable. The principle thereof is unknown but it is conceived that fine particle composites in a preferable state by wet media agitating mill treatment are easily formed.

When the microrefinement treatment is carried out using a wet media agitating mill such as a wet bead mill as an example, food materials and other components, i.e., the ingredients for the composition, are loaded in a wet media agitating mill and crushed. Conditions such as the size of beads, loading rate, outlet mesh size, delivery rate of a raw material slurry, mill rotational strength and one-time pass system (one-pass) or multiple circulation system (circulation system) may suitably be selected and adjusted according to the size and properties of food materials, further properties of the intended fine particle composite. Hereinafter, an example of specific conditions is presented but one or more embodiments is not limited to the following conditions.

It is preferable that a particle size of the bead used for a wet bead mill be typically 2 mm or less and additionally 1 mm or less. For a bead mill grinder using beads having a larger particle size than the above upper limit value (for example, a media agitating mill called a "ball mill" such as attritors which typically use beads of 3 to 10 mm), the treatment requires an extended time for obtaining a composition containing fine particles and fine particle composites in a shape specified in one or more embodiments and it is principally difficult to apply a pressure higher than the normal pressure, because it is difficult to obtain the composition of one or more embodiments. The material of bead used for a wet bead mill is preferably the same material as a material of a bead mill inner cylinder, and the material is further preferably zirconia.

The treatment using a wet media agitating mill is preferably carried out under pressure applying conditions. The method for creating pressure applying conditions at microrefinement treatment is not limited, and for preferably achieving pressure applying conditions in particularly a bead mill grinder, a method of treatment with a filter having a suitable size installed at a treatment outlet while adjusting a delivery rate of the contents and pressure applying conditions is preferable. The pressure applying conditions during treatment are not limited and it is preferable that a difference between the maximum pressure and the normal pressure during treatment time be typically 0.01 MPa or more, additionally 0.02 MPa or more, further 0.03 MPa or more and more preferably 0.04 MPa or more. When a difference between the maximum pressure and the normal pressure during treatment time is the above lower limit value or more, the composition containing fine particles and fine particle composites in a shape specified in one or more embodiments can be obtained efficiently in a short period of time. The upper limit of pressure during treatment is not limited and it is preferable that a difference between the maximum pressure and the normal pressure during treatment time be typically 1 MPa or less, additionally 0.50 MPa or less, further 0.40 MPa or less and furthermore 0.30 MPa or less as a pressure applying condition which is overwhelming is likely to cause breakage of equipment.

The temperature during microrefinement treatment using a wet media agitating mill is not also limited and may be any of high-temperature grinding, room-temperature grinding or low-temperature grinding. However, it is preferable that a sample temperature at the time of completing the grinding (treatment temperature: $T_2$) to a sample temperature immediately after starting the grinding (treatment temperature: $T_1$) be adjusted in such a way as to be a temperature increasing condition within a range satisfying "$T_1+1<T_2<T_1+50$" (the unit herein is by celsius (° C.)). It is further preferable that a sample temperature at the time of completing the grinding (treatment temperature: $T_2$) be 25° C. or more ($T_2 \geq 25$).

A target for the microrefinement treatment using a wet media agitating mill is a mixture of food materials (insoluble dietary fiber-containing food materials and other food materials) and other components. Such a mixture is preferably subjected to coarse grinding using a jet mill, a pin mill, a stone grinding mill or the like in advance as pretreatment. In this case, it is preferable that d50 (median particle size) of the mixture be adjusted to ranges typically from 10 μm or more, additionally 20 μm or more and typically 1,500 μm or less, additionally 1,000 μm or less and then subjected to the microrefinement treatment using a medium agitating mill. When a median particle size of the mixture is adjusted to within this range, it is convenient for a better industrial productivity.

When a mixture to be a target for the microrefinement treatment using a wet media agitating mill contains water, a water content of food materials (insoluble dietary fiber-containing food materials and other food materials) is adjusted to be a lower state than a water content of other components and media thereby enabling efficient production of the composition containing fine particles and fine particle composites in a shape specified in one or more embodiments, which is preferable. Specifically, it is preferable to use dried food materials as the food materials (insoluble dietary fiber-containing food materials and other food materials) as well as to add fats/oils as a medium and use water when subjecting the composition to media agitating mill treatment, particularly wet bead mill treatment.

When the viscosity of the mixture to be a target for the microrefinement treatment using a wet media agitating mill is adjusted to be a predetermined value or less, the composition containing fine particles and fine particle composites in a shape specified in one or more embodiments can be efficiently obtained, which is preferable. Specifically, it is preferable that the upper limit of a viscosity (measurement temperature: 20° C.) of the above mixture be typically 20 Pa·s or less and additionally 8 Pa·s or less. On the other hand, the lower limit value of the viscosity (measurement temperature: 20° C.) is not particularly limited and it is preferable to be typically 100 mPa·s or more and additionally 500 mPa·s or more.

When a Bostwick viscosity of the mixture to be a target for the microrefinement treatment using a media agitating mill is adjusted to be a predetermined value or less, a pressure during treatment using a wet media agitating mill is easily adjusted to the desired pressure conditions described hereinbefore thereby further increasing microrefinement treatment efficiency, which is preferable. Specifically, it is preferable that a Bostwick viscosity (measurement temperature: 20° C.) of the mixture be typically 28.0 cm or less in one second.

The number of times and the duration of the microrefinement treatment using a media agitating mill are not limited and typically crushing by the one-pass treatment enables efficient production of the composition containing fine particles and fine particle composites in a shape specified in one or more embodiments, which is preferable. For one-pass treatment, it is preferable that treatment time thereof be typically 0.1 minutes or more, additionally 1 minute or more and further 2 minutes or more, and typically 25 minutes or less, additionally 22 minutes or less and further 20 minutes or less. The duration of microrefinement treatment using a media agitating mill or a high-pressure homogenizer represents the time from a treatment target is sheared thoroughly to a composition containing desired fine particle composites of one or more embodiments is formed. As a specific example, when a bead mill crusher having, for example, a grinding chamber capacity of 100 mL and a porosity (i.e., a treated solution is injectable) of 50% when the beads are excluded is used and a sample is one-pass treated at a speed of 200 mL per minute without being circulated, an empty space capacity of the grinding chamber is 50 mL whereby a sample treatment time is (100 mL×50%)/(200 mL/min)= 0.25 min (15 sec).

[Properties and Usage of the Composition]

The composition of one or more embodiments has various excellent properties. One of them is the enhancement in emulsification capacity. In one or more embodiments, the "emulsification capacity" represents, when a salad oil is gradually poured into a sample adjusted to 20° C. while stirring at about 100 rpm until oil droplets start floating on the surface of the composition, a mass proportion (%) of the total amount of oil poured to 1 part by mass of the composition. When a total amount of oil poured per 100 g of the composition is 50 g, an emulsification capacity is 50%. A composition having a high emulsification capacity, when in contact with other fats/oils or mixed with other fats/oils, excels in the abilities to emulsify and stabilize these fats/oils. Specifically, the emulsification capacity of the composition of one or more embodiments is not limited and it is preferable to be typically 50% or more, additionally 70% or more, further 100% or more, furthermore 150% or more and particularly 200% or more. Owing to such a property, the composition of one or more embodiments can be used as a stabilizer for oil/water mixed food products and additionally exhibits properties such as preventing a dish from drying (evaporation of water derived from food materials) when the composition of one or more embodiments is eaten as a food product with a dish containing a large amount of fats/oils, further controlling oil separation (seeping of fats/oils derived from food materials) from a dish thereby to enhance the taste of the dish and also maintaining such an enhanced taste for an extended period of time. In the present specification, the "dish containing a large amount of fats/oils" refers to, unless otherwise specified, dishes containing typically 3 mass % or more and additionally 5 mass % or more of fats/oils. There are many examples of such a dish but an example thereof includes various kinds of deep-fried foods.

The composition of one or more embodiments, when eaten as a food product, also has a property of reducing (improving) the astringent taste caused by insoluble dietary fibers. The astringent taste (astringency) is a taste causing a sensation of puckering the mouth when the composition is put in the mouth. The generation mechanism thereof is unclear but the astringent taste is conceivably different from the taste perceived by stimulating taste neurons. It is believed to be a sense close to that of touch perceived by contraction of cells in the mouth. For example, red wine is characterized by a tannic flavor derived from tannin of grapes and the astringent taste is similar to these tannic flavor, bitterness and harshness but is still a different sense. Food products containing insoluble dietary fibers typically have such an astringent taste and thus often disturbs eating. However, the composition of one or more embodiments has reduced such an astringent taste despite of containing insoluble dietary fibers thereby making it easier for eating. The principle of this astringent taste improvement is unknown but it is possibly perceived that an emulsification capacity of the composition is increased with which the affinity to fats/oils is also increased, thereby somehow affecting the lipid membrane of taste bud surface.

The composition of one or more embodiments may have excellent properties in stabilities such as syneresis-preventing property (property of suppressing water separation) and dryness-preventing property (property of suppressing dryness by water evaporation). Owing to these good stabilities, the composition of one or more embodiments provides an advantage when commercially distributed as a food product due to the reduced risk of microbial growth and flavor loss and the like.

The composition of one or more embodiments can be eaten directly as a food product and also preferably used as a raw material or a material for food/drink products or liquid seasonings. That is, targets of one or more embodiments encompass food/drink products and liquid seasonings containing the composition of one or more embodiments. When the composition of one or more embodiments is used as a part of raw materials, seasonings such as sources, dipping sources, dips, mayonnaises, dressings, butters and jams having a high dispersion stability can be produced. Thus, when the composition of one or more embodiments is added to a seasoning, the amount of the composition of one or more embodiments added to the seasoning is not limited and it is desirable to be generally about 0.001 to 50 mass %. The composition may be added to a seasoning at any timing during the production. In more detail, the composition may be added to a seasoning, ingredients (food materials and the like) for the composition of one or more embodiments may be added to raw materials of a seasoning followed by carrying out the microrefinement treatment or these methods may be combined, but the method of adding the composition of one or more embodiments to a seasoning is convenient in an industrial setting, which is preferable. The composition of one or more embodiments is expected to be applied mainly in the food product field due to the unknown attribution of reducing the astringent taste described above. The present composition, due to the unknown attribution in the emulsification capacity enhancement described above, can be used as a substitute for an emulsifier in the food product field, particularly in the field where the use of food additives is avoided such as bakery field. The composition of one or more embodiments, due to the unknown attribution in the emulsification capacity enhancement described above, can be widely used as a substitute for an emulsifier in various fields in addition to the food product field, which is industrially advantageous.

When the enhancing effect on emulsification capacity, the unknown attribution demonstrated by the composition of one or more embodiments, is applied, a method for enhancing the emulsification capacity of the composition containing insoluble dietary fibers is extracted as an aspect of one or more embodiments. Such an emulsification capacity enhancement method contains the conversion of any composition containing insoluble dietary fibers by grinding to the composition of one or more embodiments described above. In such an emulsification capacity enhancement method, the composition containing insoluble dietary fibers is equivalent to the mixture of food materials and other components, i.e., the constituent elements of the composition of one or more embodiments, to be a target of the microrefinement in the method for producing the composition of one or more embodiments described hereinbefore. Other details are as described hereinbefore for the composition of one or more embodiments and the production method thereof.

When reducing the astringent taste, the unknown attribution demonstrated by the composition of one or more embodiments, is applied, a method for improving the astringent taste of the composition containing insoluble dietary fibers is extracted as an aspect of one or more embodiments. Such an astringent taste improving method contains the conversion of any composition containing insoluble dietary fibers by grinding to the composition of one or more embodiments described above. In such an astringent taste improvement method, the composition containing insoluble dietary fibers is equivalent to the mixture of food materials and other components, i.e., the constituent elements of the composition of one or more embodiments, to be a target of the microrefinement in the method for producing the composition of one or more embodiments described hereinbefore. Other details are as described hereinbefore for the composition of one or more embodiments and the production method thereof.

Examples

Hereinafter, one or more embodiments is described in further details in reference to examples but these examples are definitely illustrated for the purpose of convenience only and thus the present invention should not be limited to these examples in any sense.

[Preparation of Composition Samples]

Composition samples of Test examples 1 to 41 were prepared as follows.

Dried products of apple and avocado which are a kind of fruit, konbu kelp which is a kind of algae, cashew nut which is a kind of nuts and seeds, corn which is a kind of grains as well as beet, carrot, squash, bell pepper, broccoli and tomato which are a kind of vegetables were ground by the method described in the "Pretreatment" of Table 3 to be described hereinafter thereby to obtain dried ground products. Green pea, soybean and edamame (immature soybean harvested with pods and beans have green appearance) which are a kind of beans were boiled, removed from the pods and dried to be edible parts and ground by the method described in the "Pretreatment" of Table 3 to be described hereinafter thereby to obtain dried ground products. Each of the dried ground products was dried until a water activity reached 0.95 or less. Note that the parts commonly subjected to eating and drinking (parts other than the inedible parts) are used as the edible parts of each food material together with, as the inedible part of some food materials, corn core, bell pepper seed or stem, squash seed or gut, beet skin, broccoli stalk and leaf, edamame pod and tomato stem.

These dried ground products were suitably mixed with media, water and fats/oils as necessary, in accordance with the formulation described in the Tables to be described hereinafter, thoroughly agitated until the mixture were apparently homogeneous in a desk top agitator thereby to obtain a paste of coarsely ground composition. For the fats/oils, a commercial olive oil (saturated fatty acid 14%, unsaturated fatty acid 80%) was used.

These coarsely ground products were pretreated as necessary in accordance with the "Pretreatment" of Table 3 to be described hereinafter and microrefinement treatment was carried out in accordance with the method described in the "Microrefinement treatment method" of Table 3 to be described hereinafter. When the "bead" was used as the media, a wet bead mill microgrinder and ϕ1 mm beads were used to carry out the microrefinement treatment in accordance with treatment conditions described in the tables to be described hereinafter to obtain each of the composition samples. The pressure applying condition was adjusted in such a way that the maximum pressure (which is 0 because no pressure is applied in the treatment under a normal pressure) during the treatment is the pressure applying condition described in the tables to be described hereinafter by suitably changing the outlet opening of the wet bead mill microgrinder and the delivery rate and the microrefinement treatment was carried out under constant conditions until after the treatment was finished.

[Analysis on Morphological and Physical Characteristics of Composition Samples]

The composition samples of Test Examples 1 to 41 obtained by the above procedure were analyzed on the morphological and physical characteristics by the following procedure.

<Analysis on Morphological Characteristics of Composition Samples (Long Diameter, Short Diameter, Degree of Unevenness)>

For the morphological characteristic analysis of particles (fine particles and fine particle composites) in each of the composition samples in the state of not applying disturbance (before ultrasonication), PITA-4 manufactured by SEISHIN ENTERPRISE Co., Ltd. was used as a particle analyzer which is an apparatus for analyzing particles by a dynamic image analysis method and to which a high-pixel camera is mountable. For photographing particle images, DMK33UX290 (manufactured by The Imaging Source) was used as a camera capable of photographing planar images of more detailed than about the number of effective pixels of 1,920 (H)×1,080 (V) and pixel size of 2.8 µm×2.8 µm. An objective lens used for photographing had a magnification of 4× and flow cell used was a planar extension cell made of a synthetic quartz glass.

Photographing particle images in each of the composition samples was carried out by diluting each of the composition samples to 1,000-fold with a solvent while injecting into the flow cell at a suitable flow rate. When photographing particle images, conditions of the particle image analyzer were set in such a way that the focus was suitably set, particle shapes in the samples can be clearly confirmed and a contrast against backdrop was suitably set so that the particles in the samples can be obviously discriminated. For setting analysis conditions at the time of capturing particle images, an 8-bit grayscale imaging camera with an LED intensity of 100 and a camera gain of 100 db was used to capture planar images and subsequently 10,000 or more images of individual particle present therein were photographed at a brightness level of particle images of 115 and a contour level of 160 and subjected to the morphological characteristic analysis. Distilled water was used as the solvent and carrier solution at the time of measurement. At least 10,000 particles or more having a particle size of 2.3 µm to 1,600 µm were confirmed in 1 $cm^3$ of all composition samples before ultrasonication.

In 10,000 particle images (pixel size of 2.8 µm×2.8 µm) having 1,920 pixels×1,080 pixels of each of the composition samples before ultrasonication photographed, the particles having a minimum pixel number of 15 pixels or more were measured for the "long diameter" and "short diameter" as well as the "degree of unevenness" by the techniques described hereinbefore to calculate the numerical values N(I) to N(III) described hereinbefore. For calculating the numerical value N(III), a specific surface area per unit volume after ultrasonication to be described hereinafter was also used.

<Particle Size Distribution (Mode Size, Maximum Size, d50, Specific Surface Area Per Unit Volume)>

Particle size distribution of each of the composition samples was measured by using a Microtrac MT3300 EX2 system of MicrotracBEL Corp. as a laser diffraction particle size distribution analyzer. Distilled water was used as a solvent at the time of measurement and DMSII (Data Management System version 2, MicrotracBEL Corp.) was used as a measurement application software. At measurement, press down WASH button of the measurement software to carry out washing, then press down SET ZERO button of the same software to carry out zero adjustment, and a sample was directly loaded at SAMPLE LOADING until a concentration of the sample reached an appropriate range.

When a sample of not applying disturbance, that is, a sample before ultrasonication, was measured, a sample concentration was adjusted to within an appropriate range in 2 sample loadings after the sample was loaded and then laser diffraction measurement was immediately carried out at a flow rate of 60% and a measurement time of 10 seconds to use an obtained result as a measured value. On the other hand, when a sample after applying disturbance, that is, a sample after ultrasonication, was measured, a sample concentration was adjusted to within an appropriate range after the sample was loaded at SAMPLE LOADING and subsequently ULTRASONICATION BUTTON of the software was pressed down to apply ultrasound at frequency of 40 kHz with an output of 40 W for 3 minutes. Thereafter, defoaming treatment was carried out three times, the sample loading treatment was carried out again, the sample concentration was confirmed to have been still within the appropriate range and subsequently laser diffraction measurement was readily carried out at a flow rate of 60% and a measurement time of 10 seconds to use an obtained result as a measured value. Measurement conditions employed were distribution mode: volume, particle refractive index: 1.60, solvent refractive index: 1.333, measurement upper limit (μm)=2,000.00 μm and measurement lower limit (μm)= 0.021 μm.

A particle size distribution of each channel of the samples was measured by using a particle size of each measurement channel shown in the following Table 2 as the standard. Frequencies of the particles having a particle size or less than those specified in each channel and also having a particle size larger than those specified in a channel having a number greater by one (the maximum channel in the measurement range uses the measurement lower limit particle size) were measured by each channel, whereby the particle frequency % of each channel was determined by using the total frequency of all channels within the measurement range as the denominator. Specifically, the particle frequencies % of the following 132 channels were measured respectively. From the results obtained by the measurement, the particle size of the channel having the highest particle frequency % was determined as the modal particle size. When there are multiple channels with exactly the same particle frequency %, the particle size of a channel having the smallest particle size among them was employed as the modal particle size. A particle size of the channel having the largest particle size among the channels in which the particle frequencies % were detected was employed as the maximum particle size.

TABLE 2

| Channel | Particle size (μm) |
| --- | --- |
| 1 | 2000.000 |
| 2 | 1826.000 |
| 3 | 1674.000 |
| 4 | 1535.000 |
| 5 | 1408.000 |
| 6 | 1291.000 |
| 7 | 1184.000 |
| 8 | 1086.000 |
| 9 | 995.600 |
| 10 | 913.000 |
| 11 | 837.200 |
| 12 | 767.700 |
| 13 | 704.000 |
| 14 | 645.600 |
| 15 | 592.000 |
| 16 | 542.900 |
| 17 | 497.800 |
| 18 | 456.500 |
| 19 | 418.600 |
| 20 | 383.900 |
| 21 | 352.000 |
| 22 | 322.800 |
| 23 | 296.000 |
| 24 | 271.400 |
| 25 | 248.900 |
| 26 | 228.200 |
| 27 | 209.300 |
| 28 | 191.900 |
| 29 | 176.000 |
| 30 | 161.400 |
| 31 | 148.000 |
| 32 | 135.700 |
| 33 | 124.500 |
| 34 | 114.100 |
| 35 | 104.700 |
| 36 | 95.960 |
| 37 | 88.000 |
| 38 | 80.700 |
| 39 | 74.000 |
| 40 | 67.860 |
| 41 | 62.230 |
| 42 | 57.060 |
| 43 | 52.330 |
| 44 | 47.980 |

TABLE 2-continued

| Channel | Particle size (μm) |
| --- | --- |
| 45 | 44.000 |
| 46 | 40.350 |
| 47 | 37.000 |
| 48 | 33.930 |
| 49 | 31.110 |
| 50 | 28.530 |
| 51 | 26.160 |
| 52 | 23.990 |
| 53 | 22.000 |
| 54 | 20.170 |
| 55 | 18.500 |
| 56 | 16.960 |
| 57 | 15.560 |
| 58 | 14.270 |
| 59 | 13.080 |
| 60 | 12.000 |
| 61 | 11.000 |
| 62 | 10.090 |
| 63 | 9.250 |
| 64 | 8.482 |
| 65 | 7.778 |
| 66 | 7.133 |
| 67 | 6.541 |
| 68 | 5.998 |
| 69 | 5.500 |
| 70 | 5.044 |
| 71 | 4.625 |
| 72 | 4.241 |
| 73 | 3.889 |
| 74 | 3.566 |
| 75 | 3.270 |
| 76 | 2.999 |
| 77 | 2.750 |
| 78 | 2.522 |
| 79 | 2.312 |
| 80 | 2.121 |
| 81 | 1.945 |
| 82 | 1.783 |
| 83 | 1.635 |
| 84 | 1.499 |
| 85 | 1.375 |
| 86 | 1.261 |
| 87 | 1.156 |
| 88 | 1.060 |
| 89 | 0.972 |
| 90 | 0.892 |
| 91 | 0.818 |
| 92 | 0.750 |
| 93 | 0.688 |
| 94 | 0.630 |
| 95 | 0.578 |
| 96 | 0.530 |
| 97 | 0.486 |
| 98 | 0.446 |
| 99 | 0.409 |
| 100 | 0.375 |
| 101 | 0.344 |
| 102 | 0.315 |
| 103 | 0.289 |
| 104 | 0.265 |
| 105 | 0.243 |
| 106 | 0.223 |
| 107 | 0.204 |
| 108 | 0.187 |
| 109 | 0.172 |
| 110 | 0.158 |
| 111 | 0.145 |
| 112 | 0.133 |
| 113 | 0.122 |
| 114 | 0.111 |
| 115 | 0.102 |
| 116 | 0.094 |
| 117 | 0.086 |
| 118 | 0.079 |
| 119 | 0.072 |
| 120 | 0.066 |
| 121 | 0.061 |
| 122 | 0.056 |

TABLE 2-continued

| Channel | Particle size (μm) |
|---|---|
| 123 | 0.051 |
| 124 | 0.047 |
| 125 | 0.043 |
| 126 | 0.039 |
| 127 | 0.036 |
| 128 | 0.033 |
| 129 | 0.030 |
| 130 | 0.028 |
| 131 | 0.026 |
| 132 | 0.023 |

<Emulsification Capacity>

Each of the composition samples was adjusted to 20° C., a salad oil was gradually poured thereinto while agitating at about 100 rpm and the pouring was stopped when oil droplets started floating on the surface of the composition to measure a mass proportion (%) of the total amount of oil poured to the composition sample.

[Sensory Evaluation of the Composition Samples]

Sensory evaluation was carried out by the following procedure on the composition samples of Test Example 1 to 41 obtained by the above procedure.

<Dryness Control, Oil Separation Control and Taste of Fat/Oil-Containing Dish>

Deep-fried chicken (lipid 8%) was used as a fat/oil-containing dish. The dish was microwaved, followed by placing one tablespoon of each of the composition samples thereon, and allowed to stand in a refrigerator (4° C.) overnight (approximately 16 hours). Subsequently, a cumulative total of ten trained sensory inspectors tasted the food samples and evaluated the taste.

Specifically, for the "dryness control", the evaluation was made on the degree of dryness of the dishes while eating on 5 scales of 5: moisty and tasty, 4: rather moisty and rather tasty, 3: rather crumbly but tolerable, 2: rather crumbly and not tasty, 1: crumbly and not tasty.

For the "oil separation control", the evaluation was made on oil separation (seeping of fats/oils derived from food materials) from the dish while eating on 5 scales of 5: little oil separation, 4: rather little oil separation, 3: oil separation noted but tolerable, 2: rather much oil separation, 1: much oil separation.

For the "taste of fat/oil-containing dish", the evaluation was made on taste of the fat/oil-containing dish (deep-fried chicken) on 5 scales of 5: tasty, 4: rather tasty, 3: average, 2: rather not tasty, 1: not tasty.

<Astringent Taste>

A cumulative total of ten trained sensory inspectors tasted one tablespoon of each of the composition samples and evaluated on the quality of "astringent taste" while eating. Specifically, the evaluation was made on an astringent taste of the composition samples while eating on 5 scales of 5: no astringent taste was observed and tasty, 4: little astringent taste was observed and rather tasty, 3: astringent taste was rather notable but tolerable, 2: astringent taste was rather notable and rather not tasty, 1: astringent taste was notable and not tasty.

<Stability (Prevention from Syneresis), Stability (Prevention from Dryness)>

A cumulative total of ten trained sensory inspectors visually observed each of the composition sample thinly stretched to a thickness of 1 mm on a plate and evaluated qualities thereof.

Specifically, for the "stability (prevention from syneresis)", the sensory inspectors evaluated the degree of separation of water in the composition samples which were allowed to stand at 4° C. overnight (16 hours) by comparing with a composition sample immediately after production. The evaluation was made on 5-scale marks of 5: substantially no syneresis and preferable, 4: drop separation noted on the composition surface but little as a whole and rather preferable, 3: drop separation noted on the composition surface but tolerable, 2: drop separation noted on the composition surface in a rather large number and rather not preferable, 1: drop separation noted on the composition surface in a rather notable number and not preferable.

For the "stability (prevention from dryness)", the sensory inspectors evaluated the degree of dryness of the composition samples which were allowed to stand at 4° C. overnight (16 hours) by comparing with a composition sample immediately after production. The evaluation was made on 5-scale marks of 5: dryness of the composition was hardly observed and preferable, 4: dryness of the composition was not observed so much and rather preferable, 3: dryness of the composition was observed but tolerable, 2: dryness of the composition was rather notable and rather not preferable, 1: dryness of the composition was notable and not preferable.

<Operation Procedure of Sensory Evaluation>

Discrimination trainings of the following A) to C) were provided to the sensory inspectors on the evaluation items relating to the sense of taste, "dryness control", "oil separation control", "taste of fat/oil-containing dish" and "astringent taste" out of the above various sensory tests thereby to select inspectors who particularly excelled in the achievement, were experienced in product development, had enough knowledge in qualities such as product taste and appearance and were capable of carrying out absolute evaluations on each of the sensory inspections.

A) Quality of taste discrimination test in which, for five flavors (sweetness: taste of sugar, acidity: taste of tartaric acid, umami: taste of sodium glutamate, salty: taste of sodium chloride, bitterness: taste of caffeine), aqueous solutions having concentrations close to thresholds of the respective components are prepared and two distilled water samples are added to make a total of seven samples, and from which the sample of each taste is accurately discriminated.

B) Concentration discrimination test in which concentration differences in five kinds of saline solutions and acetic acid aqueous solutions having slightly different concentrations are accurately discriminated.

C) Three-item discrimination test in which a total of three samples of two soy sauces from manufacturer A and 1 soy sauce from manufacturer B are provided from which the soy sauce from manufacturer B is accurately discriminated.

For all of the above evaluation items, reference samples were evaluated by all inspectors in advance to standardize each score for the evaluation criteria and then an objective sensory inspection was carried out by a cumulative total of ten panelists. The evaluation of each evaluation item was made by a method in which each inspector selected one number closest to his/her own evaluation from the 5-scale marks on each item. Tally of the evaluation results were calculated from the arithmetic mean of the scores by a total of ten panelists and standard deviations were further calculated to evaluate variations among the panelists.

[Analysis and Evaluation Results on the Composition Samples]

The analysis and evaluation results on the composition samples of Test Examples 1 to 41 are shown in the following Tables 3 and 4.

TABLE 3

|  |  |  | Test Example | | | |
|---|---|---|---|---|---|---|
|  |  |  | 1 | 2 | 3 | 4 |
| Formulation | [Edible part] dried carrot | Parts by mass | | | | |
| | [Edible part] dried squash | Parts by mass | | | | |
| | [Edible part] dried corn | Parts by mass | 200 | 200 | 300 | 40 |
| | [Edible part] dried soybean | Parts by mass | | | | |
| | [Edible part] dried edamame | Parts by mass | | | | |
| | [Edible part] dried bell pepper | Parts by mass | | | | |
| | [Edible part] dried beet | Parts by mass | | | | |
| | [Edible part] dried green pea | Parts by mass | | | | |
| | [Edible part] dried broccoli | Parts by mass | | | | |
| | [Edible part] dried tomato | Parts by mass | | | | |
| | [Edible part] dried avocado | Parts by mass | | | | |
| | [Edible part] dried apple | Parts by mass | | | | |
| | [Edible part] dried konbu kelp | Parts by mass | | | | |
| | [Edible part] dried cashew nut | Parts by mass | | | | |
| | [Inedible part] dried corn (core) | Parts by mass | | | 200 | |
| | [Inedible part] dried bell pepper (seed, stem) | Parts by mass | | | | |
| | [Inedible part] dried squash (seed, gut) | Parts by mass | | | | |
| | [Inedible part] dried beet (skin) | Parts by mass | | | | |
| | [Inedible part] dried broccoli (stalk, leaf) | Parts by mass | | | | |
| | [Inedible part] dried edamame (pod) | Parts by mass | | | | |
| | [Inedible part] dried tomato (stem) | Parts by mass | | | | |
| | Olive oil | Parts by mass | 200 | 80 | 80 | |
| | Water | Parts by mass | 600 | 720 | 420 | 960 |
| | Total | Parts by mass | 1000 | 1000 | 1000 | 1000 |
| | Inedible part percentage | Mass % | 0.0% | 0.0% | 38.5% | 0.0% |
| | Inedible part/(edible part + inedible part) | % | 0.0% | 0.0% | 40.0% | 0.0% |
| | Available carbohydrate content in insoluble dietary fiber-containing food material | Mass % | 43 | 43 | 26 | 43 |
| | Water activity of insoluble dietary fiber-containing food material | | 0.444 | 0.494 | 0.423 | 0.46 |
| Microrefinement treatment conditions | Pretreatment | | Jet mill | Jet mill | Jet mill | Jet mill |
| | Microrefinement treatment method | | Media agitating mill | Media agitating mill | Media agitating mill | Media agitating mill |
| | Treatment time | Minutes | 5 | 5 | 5 | 1 |
| | Bead size | | Bead mill φ1 mm bead | Bead mill φ1 mm bead | Bead mill φ1 mm bead | Bead mill φ1 mm bead |
| | Treatment temperature (immediately after starting) | (T1) °C. | 20 | 22 | 22 | 22 |
| | Treatment temperature (at time of completing treatment) | (T2) °C. | 31 | 26 | 26 | 23 |
| | Pressure applying condition at microrefining (Max pressure) | MPa | 0 (Normal pressure) | 0.35 | 0.30 | 0.10 |
| Measured values | Insoluble dietary fiber content | Mass % | 1.8% | 1.8% | 5.9% | 0.4% |
| | Fine particle composite content | Mass % | 31.9 | 32.8 | 77.7 | 10.0 |
| | Water content | Mass % | 61.8 | 73.3 | 43.5 | 96.2 |
| | Total fat/oil content | Mass % | 21.5 | 9.3 | 9.9 | 0.2 |
| | Water content/(water content + total fat/oil content) | % | 74.1% | 88.8% | 81.5% | 99.8% |

|  |  |  | Test Example | | | |
|---|---|---|---|---|---|---|
|  |  |  | 5 | 6 | 7 | 8 |
| Formulation | [Edible part] dried carrot | Parts by mass | | | | |
| | [Edible part] dried squash | Parts by mass | | | | |
| | [Edible part] dried corn | Parts by mass | | 100 | 50 | 150 |
| | [Edible part] dried soybean | Parts by mass | | | | |
| | [Edible part] dried edamame | Parts by mass | | | | |
| | [Edible part] dried bell pepper | Parts by mass | | | | |
| | [Edible part] dried beet | Parts by mass | | | | |
| | [Edible part] dried green pea | Parts by mass | | | | |
| | [Edible part] dried broccoli | Parts by mass | | | | |
| | [Edible part] dried tomato | Parts by mass | | | | |
| | [Edible part] dried avocado | Parts by mass | 60 | | | |
| | [Edible part] dried apple | Parts by mass | | | 50 | |
| | [Edible part] dried konbu kelp | Parts by mass | | | | |
| | [Edible part] dried cashew nut | Parts by mass | | | | |

TABLE 3-continued

|  |  |  |  |  |  |  |
|---|---|---|---|---|---|---|
|  | [Inedible part] dried corn (core) | Parts by mass |  |  | 50 | 50 |
|  | [Inedible part] dried bell pepper (seed, stem) | Parts by mass |  |  |  |  |
|  | [Inedible part] dried squash (seed, gut) | Parts by mass |  |  |  |  |
|  | [Inedible part] dried beet (skin) | Parts by mass |  |  |  |  |
|  | [Inedible part] dried broccoli (stalk, leaf) | Parts by mass |  |  |  |  |
|  | [Inedible part] dried edamame (pod) | Parts by mass |  |  |  |  |
|  | [Inedible part] dried tomato (stem) | Parts by mass |  |  |  |  |
|  | Olive oil | Parts by mass |  | 100 |  |  |
|  | Water | Parts by mass | 940 | 800 | 850 | 800 |
|  | Total | Parts by mass | 1000 | 1000 | 1000 | 1000 |
|  | Inedible part percentage | Mass % | 0.0% | 0.0% | 9.2% | 9.3% |
|  | Inedible part/(edible part + inedible part) | % | 0.0% | 0.0% | 33.3% | 25.0% |
|  | Available carbohydrate content in insoluble dietary fiber-containing food material | Mass % | 16 | 43 | 23 | 32 |
|  | Water activity of insoluble dietary fiber-containing food material |  | 0.344 | 0.372 | 0.331 | 0.35 |
| Microrefinement treatment conditions | Pretreatment |  | Jet mill | Jet mill | Jet mill | Jet mill |
|  | Microrefinement treatment method |  | Media agitating mill | Media agitating mill | Media agitating mill | Media agitating mill |
|  | Treatment time | Minutes | 3 | 5 | 5 | 5 |
|  | Bead size |  | Bead mill φ1 mm bead | Bead mill φ1 mm bead | Bead mill φ1 mm bead | Bead mill φ1 mm bead |
|  | Treatment temperature (immediately after starting) (T1) | ° C. | 23 | 23 | 20 | 23 |
|  | Treatment temperature (at time of completing treatment) (T2) | ° C. | 29 | 24 | 31 | 32 |
|  | Pressure applying condition at microrefining (Max pressure) | MPa | 0.01 | 0.34 | 0.14 | 0.23 |
| Measured values | Insoluble dietary fiber content | Mass % | 0.8% | 0.9% | 1.9% | 2.1% |
|  | Fine particle composite content | Mass % | 13.2 | 18.3 | 27.4 | 34.5 |
|  | Water content | Mass % | 94.0 | 81.0 | 85.2 | 80.6 |
|  | Total fat/oil content | Mass % | 3.6 | 10.7 | 0.3 | 0.9 |
|  | Water content/(water content + total fat/oil content) | % | 96.3% | 88.4% | 99.6% | 98.9% |

|  |  |  | Test Example | | | |
|---|---|---|---|---|---|---|
|  |  |  | 9 | 10 | 11 | 12 |
| Formulation | [Edible part] dried carrot | Parts by mass |  |  |  |  |
|  | [Edible part] dried squash | Parts by mass |  |  |  |  |
|  | [Edible part] dried corn | Parts by mass | 200 | 200 | 200 | 200 |
|  | [Edible part] dried soybean | Parts by mass |  |  |  |  |
|  | [Edible part] dried edamame | Parts by mass |  |  |  |  |
|  | [Edible part] dried bell pepper | Parts by mass |  |  |  |  |
|  | [Edible part] dried beet | Parts by mass |  |  |  |  |
|  | [Edible part] dried green pea | Parts by mass |  |  |  |  |
|  | [Edible part] dried broccoli | Parts by mass |  |  |  |  |
|  | [Edible part] dried tomato | Parts by mass |  |  |  |  |
|  | [Edible part] dried avocado | Parts by mass |  |  |  |  |
|  | [Edible part] dried apple | Parts by mass |  |  |  |  |
|  | [Edible part] dried konbu kelp | Parts by mass |  |  |  |  |
|  | [Edible part] dried cashew nut | Parts by mass |  |  |  |  |
|  | [Inedible part] dried corn (core) | Parts by mass |  |  |  |  |
|  | [Inedible part] dried bell pepper (seed, stem) | Parts by mass |  |  |  |  |
|  | [Inedible part] dried squash (seed, gut) | Parts by mass |  |  |  |  |
|  | [Inedible part] dried beet (skin) | Parts by mass |  |  |  |  |
|  | [Inedible part] dried broccoli (stalk, leaf) | Parts by mass |  |  |  |  |
|  | [Inedible part] dried edamame (pod) | Parts by mass |  |  |  |  |
|  | [Inedible part] dried tomato (stem) | Parts by mass |  |  |  |  |
|  | Olive oil | Parts by mass |  |  |  |  |
|  | Water | Parts by mass | 800 | 800 | 800 | 800 |
|  | Total | Parts by mass | 1000 | 1000 | 1000 | 1000 |
|  | Inedible part percentage | Mass % | 0.0% | 0.0% | 0.0% | 0.0% |
|  | Inedible part/(edible part + inedible part) | % | 0.0% | 0.0% | 0.0% | 0.0% |

TABLE 3-continued

|  |  |  |  |  |  |  |
|---|---|---|---|---|---|---|
|  | Available carbohydrate content in insoluble dietary fiber-containing food material | Mass % | 43 | 43 | 43 | 43 |
|  | Water activity of insoluble dietary fiber-containing food material |  | 0.388 | 0.363 | 0.395 | 0.383 |
| Microrefinement treatment conditions | Pretreatment |  | Rotation crusher (Wonder crusher) | Jet mill | Jet mill | Jet mill |
|  | Microrefinement treatment method |  | — | — | Media agitating mill | Media agitating mill |
|  | Treatment time | Minutes | — | — | 5 | 10 |
|  | Bead size |  | — | — | Bead mill φ1 mm bead | Bead mill φ1 mm bead |
|  | Treatment temperature (immediately after starting) (T1) | ° C. | — | — | 22 | 20 |
|  | Treatment temperature (at time of completing treatment) (T2) | ° C. | — | — | 27 | 34 |
|  | Pressure applying condition at microrefining (Max pressure) | MPa | 0 (Normal pressure) | 0 (Normal pressure) | 0.32 | 0.29 |
| Measured values | Insoluble dietary fiber content | Mass % | 1.8% | 1.8% | 1.8% | 1.8% |
|  | Fine particle composite content | Mass % | 30.8 | 32.2 | 34.3 | 34.5 |
|  | Water content | Mass % | 80.8 | 80.8 | 80.8 | 80.8 |
|  | Total fat/oil content | Mass % | 1.2 | 1.2 | 1.2 | 1.2 |
|  | Water content/(water content + total fat/oil content) | % | 98.5% | 98.5% | 98.5% | 98.5% |

| | | | Test Example | | |
|---|---|---|---|---|---|
| | | | 13 | 14 | 15 |
| Formulation | [Edible part] dried carrot | Parts by mass |  |  |  |
|  | [Edible part] dried squash | Parts by mass |  |  |  |
|  | [Edible part] dried corn | Parts by mass | 200 |  |  |
|  | [Edible part] dried soybean | Parts by mass |  | 200 | 200 |
|  | [Edible part] dried edamame | Parts by mass |  |  |  |
|  | [Edible part] dried bell pepper | Parts by mass |  |  |  |
|  | [Edible part] dried beet | Parts by mass |  |  |  |
|  | [Edible part] dried green pea | Parts by mass |  |  |  |
|  | [Edible part] dried broccoli | Parts by mass |  |  |  |
|  | [Edible part] dried tomato | Parts by mass |  |  |  |
|  | [Edible part] dried avocado | Parts by mass |  |  |  |
|  | [Edible part] dried apple | Parts by mass |  |  |  |
|  | [Edible part] dried konbu kelp | Parts by mass |  |  |  |
|  | [Edible part] dried cashew nut | Parts by mass |  |  |  |
|  | [Inedible part] dried corn (core) | Parts by mass |  |  |  |
|  | [Inedible part] dried bell pepper (seed, stem) | Parts by mass |  |  |  |
|  | [Inedible part] dried squash (seed, gut) | Parts by mass |  |  |  |
|  | [Inedible part] dried beet (skin) | Parts by mass |  |  |  |
|  | [Inedible part] dried broccoli (stalk, leaf) | Parts by mass |  |  |  |
|  | [Inedible part] dried edamame (pod) | Parts by mass |  |  |  |
|  | [Inedible part] dried tomato (stem) | Parts by mass |  |  |  |
|  | Olive oil | Parts by mass |  |  |  |
|  | Water | Parts by mass | 800 | 800 | 800 |
|  | Total | Parts by mass | 1000 | 1000 | 1000 |
|  | Inedible part percentage | Mass % | 0.0% | 0.0% | 0.0% |
|  | Inedible part/(edible part + inedible part) | % | 0.0% | 0.0% | 0.0% |
|  | Available carbohydrate content in insoluble dietary fiber-containing food material | Mass % | 43 | 7 | 7 |
|  | Water activity of insoluble dietary fiber-containing food material |  | 0.467 | 0.302 | 0.415 |
| Microrefinement treatment conditions | Pretreatment |  | Jet mill | Rotation crusher (Wonder crusher) | Jet mill |
|  | Microrefinement treatment method |  | Media agitating mill | — | — |
|  | Treatment time | Minutes | 20 | — | — |
|  | Bead size |  | Bead mill φ1 mm bead | — | — |

TABLE 3-continued

|  |  |  |  |  |  |  |
|---|---|---|---|---|---|---|
|  | Treatment temperature (immediately after starting) | (T1) | ° C. | 23 | — | — |
|  | Treatment temperature (at time of completing treatment) | (T2) | ° C. | 42 | — | — |
|  | Pressure applying condition at microrefining (Max pressure) |  | MPa | 0.40 | 0 (Normal pressure) | 0 (Normal pressure) |
| Measured values | Insoluble dietary fiber content |  | Mass % | 1.8% | 3.5% | 3.5% |
|  | Fine particle composite content |  | Mass % | 35.3 | 31.0 | 32.5 |
|  | Water content |  | Mass % | 80.8 | 80.8 | 80.8 |
|  | Total fat/oil content |  | Mass % | 1.2 | 4.8 | 4.8 |
|  | Water content/(water content + total fat/oil content) |  | % | 98.5% | 94.4% | 94.4% |

|  |  |  | Test Example | | | |
|---|---|---|---|---|---|---|
|  |  |  | 16 | 17 | 18 | 19 |
| Formulation | [Edible part] dried carrot | Parts by mass |  |  |  | 200 |
|  | [Edible part] dried squash | Parts by mass |  |  |  |  |
|  | [Edible part] dried corn | Parts by mass |  |  |  |  |
|  | [Edible part] dried soybean | Parts by mass | 200 | 200 | 200 |  |
|  | [Edible part] dried edamame | Parts by mass |  |  |  |  |
|  | [Edible part] dried bell pepper | Parts by mass |  |  |  |  |
|  | [Edible part] dried beet | Parts by mass |  |  |  |  |
|  | [Edible part] dried green pea | Parts by mass |  |  |  |  |
|  | [Edible part] dried broccoli | Parts by mass |  |  |  |  |
|  | [Edible part] dried tomato | Parts by mass |  |  |  |  |
|  | [Edible part] dried avocado | Parts by mass |  |  |  |  |
|  | [Edible part] dried apple | Parts by mass |  |  |  |  |
|  | [Edible part] dried konbu kelp | Parts by mass |  |  |  |  |
|  | [Edible part] dried cashew nut | Parts by mass |  |  |  |  |
|  | [Inedible part] dried corn (core) | Parts by mass |  |  |  |  |
|  | [Inedible part] dried bell pepper (seed, stem) | Parts by mass |  |  |  |  |
|  | [Inedible part] dried squash (seed, gut) | Parts by mass |  |  |  |  |
|  | [Inedible part] dried beet (skin) | Parts by mass |  |  |  |  |
|  | [Inedible part] dried broccoli (stalk, leaf) | Parts by mass |  |  |  |  |
|  | [Inedible part] dried edamame (pod) | Parts by mass |  |  |  |  |
|  | [Inedible part] dried tomato (stem) | Parts by mass |  |  |  |  |
|  | Olive oil | Parts by mass |  |  |  |  |
|  | Water | Parts by mass | 800 | 800 | 800 | 800 |
|  | Total | Parts by mass | 1000 | 1000 | 1000 | 1000 |
|  | Inedible part percentage | Mass % | 0.0% | 0.0% | 0.0% | 0.0% |
|  | Inedible part/(edible part + inedible part) | % | 0.0% | 0.0% | 0.0% | 0.0% |
|  | Available carbohydrate content in insoluble dietary fiber-containing food material | Mass % | 7 | 7 | 7 | 37 |
|  | Water activity of insoluble dietary fiber-containing food material |  | 0.322 | 0.493 | 0.466 | 0.393 |
| Microrefinement treatment conditions | Pretreatment |  | Jet mill | Jet mill | Jet mill | Rotation crusher (Wonder crusher) |
|  | Microrefinement treatment method |  | Media agitating mill | Media agitating mill | Media agitating mill | — |
|  | Treatment time | Minutes | 5 | 10 | 20 | — |
|  | Bead size |  | Bead mill φ1 mm bead | Bead mill φ1 mm bead | Bead mill φ1 mm bead | — |
|  | Treatment temperature (immediately after starting) (T1) | ° C. | 21 | 20 | 23 | — |
|  | Treatment temperature (at time of completing treatment) (T2) | ° C. | 24 | 44 | 26 | — |
|  | Pressure applying condition at microrefining (Max pressure) | MPa | 0.39 | 0.43 | 0.34 | 0 (Normal pressure) |
| Measured values | Insoluble dietary fiber content | Mass % | 3.5% | 3.5% | 3.5% | 2.4% |
|  | Fine particle composite content | Mass % | 33.9 | 33.6 | 34.5 | 30.2 |
|  | Water content | Mass % | 80.8 | 80.8 | 80.8 | 80.8 |
|  | Total fat/oil content | Mass % | 4.8 | 4.8 | 4.8 | 0.2 |
|  | Water content/(water content + total fat/oil content) | % | 94.4% | 94.4% | 94.4% | 99.8% |

TABLE 3-continued

|  |  |  | Test Example | | | |
|---|---|---|---|---|---|---|
|  |  |  | 20 | 21 | 22 | 23 |
| Formulation | [Edible part] dried carrot | Parts by mass | 600 | 200 | 200 | 200 |
|  | [Edible part] dried squash | Parts by mass |  |  |  |  |
|  | [Edible part] dried corn | Parts by mass |  |  |  |  |
|  | [Edible part] dried soybean | Parts by mass |  |  |  |  |
|  | [Edible part] dried edamame | Parts by mass |  |  |  |  |
|  | [Edible part] dried bell pepper | Parts by mass |  |  |  |  |
|  | [Edible part] dried beet | Parts by mass |  |  |  |  |
|  | [Edible part] dried green pea | Parts by mass |  |  |  |  |
|  | [Edible part] dried broccoli | Parts by mass |  |  |  |  |
|  | [Edible part] dried tomato | Parts by mass |  |  |  |  |
|  | [Edible part] dried avocado | Parts by mass |  |  |  |  |
|  | [Edible part] dried apple | Parts by mass |  |  |  |  |
|  | [Edible part] dried konbu kelp | Parts by mass |  |  |  |  |
|  | [Edible part] dried cashew nut | Parts by mass |  |  |  |  |
|  | [Inedible part] dried corn (core) | Parts by mass |  |  |  |  |
|  | [Inedible part] dried bell pepper (seed, stem) | Parts by mass |  |  |  |  |
|  | [Inedible part] dried squash (seed, gut) | Parts by mass |  |  |  |  |
|  | [Inedible part] dried beet (skin) | Parts by mass |  |  |  |  |
|  | [Inedible part] dried broccoli (stalk, leaf) | Parts by mass |  |  |  |  |
|  | [Inedible part] dried edamame (pod) | Parts by mass |  |  |  |  |
|  | [Inedible part] dried tomato (stem) | Parts by mass |  |  |  |  |
|  | Olive oil | Parts by mass |  |  |  |  |
|  | Water | Parts by mass | 400 | 800 | 800 | 800 |
|  | Total | Parts by mass | 1000 | 1000 | 1000 | 1000 |
|  | Inedible part percentage | Mass % | 0.0% | 0.0% | 0.0% | 0.0% |
|  | Inedible part/(edible part + inedible part) | % | 0.0% | 0.0% | 0.0% | 0.0% |
|  | Available carbohydrate content in insoluble dietary fiber-containing food material | Mass % | 37 | 37 | 37 | 37 |
|  | Water activity of insoluble dietary fiber-containing food material |  | 0.455 | 0.469 | 0.46 | 0.367 |
| Microrefinement treatment conditions | Pretreatment |  | Jet mill | Jet mill | Jet mill | Jet mill |
|  | Microrefinement treatment method |  | — | Media agitating mill | Media agitating mill | Media agitating mill |
|  | Treatment time | Minutes | — | 5 | 10 | 20 |
|  | Bead size |  | — | Bead mill φ1 mm bead | Bead mill φ1 mm bead | Bead mill φ1 mm bead |
|  | Treatment temperature (immediately after starting) | (T1) ° C. | — | 23 | 22 | 22 |
|  | Treatment temperature (at time of completing treatment) | (T2) ° C. | — | 32 | 24 | 63 |
|  | Pressure applying condition at microrefining (Max pressure) | MPa | 0 (Normal pressure) | 0.18 | 0.19 | 0.23 |
| Measured values | Insoluble dietary fiber content | Mass % | 7.1% | 2.4% | 2.4% | 2.4% |
|  | Fine particle composite content | Mass % | 90.6 | 31.4 | 31.6 | 32.4 |
|  | Water content | Mass % | 42.4 | 80.8 | 80.8 | 80.8 |
|  | Total fat/oil content | Mass % | 0.6 | 0.2 | 0.2 | 0.2 |
|  | Water content/(water content + total fat/oil content) | % | 98.6% | 99.8% | 99.8% | 99.8% |

|  |  |  | Test Example | | | |
|---|---|---|---|---|---|---|
|  |  |  | 24 | 25 | 26 | 27 |
| Formulation | [Edible part] dried carrot | Parts by mass | 200 |  |  |  |
|  | [Edible part] dried squash | Parts by mass |  | 200 | 200 | 200 |
|  | [Edible part] dried corn | Parts by mass |  |  |  |  |
|  | [Edible part] dried soybean | Parts by mass |  |  |  |  |
|  | [Edible part] dried edamame | Parts by mass |  |  |  |  |
|  | [Edible part] dried bell pepper | Parts by mass |  |  |  |  |
|  | [Edible part] dried beet | Parts by mass |  |  |  |  |
|  | [Edible part] dried green pea | Parts by mass |  |  |  |  |
|  | [Edible part] dried broccoli | Parts by mass |  |  |  |  |
|  | [Edible part] dried tomato | Parts by mass |  |  |  |  |
|  | [Edible part] dried avocado | Parts by mass |  |  |  |  |
|  | [Edible part] dried apple | Parts by mass |  |  |  |  |
|  | [Edible part] dried konbu kelp | Parts by mass |  |  |  |  |
|  | [Edible part] dried cashew nut | Parts by mass |  |  |  |  |
|  | [Inedible part] dried corn (core) | Parts by mass |  |  |  |  |

TABLE 3-continued

|  |  |  |  |  |  |  |
|---|---|---|---|---|---|---|
|  | [Inedible part] dried bell pepper (seed, stem) | Parts by mass |  |  |  |  |
|  | [Inedible part] dried squash (seed, gut) | Parts by mass |  |  |  |  |
|  | [Inedible part] dried beet (skin) | Parts by mass |  |  |  |  |
|  | [Inedible part] dried broccoli (stalk, leaf) | Parts by mass |  |  |  |  |
|  | [Inedible part] dried edamame (pod) | Parts by mass |  |  |  |  |
|  | [Inedible part] dried tomato (stem) | Parts by mass |  |  |  |  |
|  | Olive oil | Parts by mass | 100 |  |  |  |
|  | Water | Parts by mass | 700 | 800 | 800 | 800 |
|  | Total | Parts by mass | 1000 | 1000 | 1000 | 1000 |
|  | Inedible part percentage | Mass % | 0.0% | 0.0% | 0.0% | 0.0% |
|  | Inedible part/(edible part + inedible part) | % | 0.0% | 0.0% | 0.0% | 0.0% |
|  | Available carbohydrate content in insoluble dietary fiber-containing food material | Mass % | 37 | 43 | 43 | 43 |
|  | Water activity of insoluble dietary fiber-containing food material |  | 0.371 | 0.391 | 0.339 | 0.346 |
| Microrefinement treatment conditions | Pretreatment |  | Jet mill | Jet mill | Jet mill | Jet mill |
|  | Microrefinement treatment method |  | Media agitating mill | — | Media agitating mill | Media agitating mill |
|  | Treatment time | Minutes | 20 | — | 5 | 10 |
|  | Bead size |  | Bead mill φ1 mm bead | — | Bead mill φ1 mm bead | Bead mill φ1 mm bead |
|  | Treatment temperature (immediately after starting) (T1) | ° C. | 22 | — | 21 | 21 |
|  | Treatment temperature (at time of completing treatment) (T2) | ° C. | 61 | — | 32 | 43 |
|  | Pressure applying condition at microrefining (Max pressure) | MPa | 0.41 | 0 (Normal pressure) | 0.12 | 0.32 |
| Measured values | Insoluble dietary fiber content | Mass % | 2.4% | 2.7% | 2.7% | 2.7% |
|  | Fine particle composite content | Mass % | 33.9 | 31.9 | 32.5 | 32.7 |
|  | Water content | Mass % | 71.4 | 80.8 | 80.8 | 80.8 |
|  | Total fat/oil content | Mass % | 10.3 | 0.4 | 0.4 | 0.4 |
|  | Water content/(water content + total fat/oil content) | % | 87.4% | 99.5% | 99.5% | 99.5% |

|  |  |  | Test Example | | | |
|---|---|---|---|---|---|---|
|  |  |  | 28 | 29 | 30 | 31 |
| Formulation | [Edible part] dried carrot | Parts by mass |  |  |  |  |
|  | [Edible part] dried squash | Parts by mass |  | 200 | 100 | 100 |
|  | [Edible part] dried corn | Parts by mass |  |  |  |  |
|  | [Edible part] dried soybean | Parts by mass |  |  |  |  |
|  | [Edible part] dried edamame | Parts by mass |  |  |  | 300 |
|  | [Edible part] dried bell pepper | Parts by mass |  |  |  |  |
|  | [Edible part] dried beet | Parts by mass |  |  |  |  |
|  | [Edible part] dried green pea | Parts by mass |  |  |  |  |
|  | [Edible part] dried broccoli | Parts by mass |  |  |  |  |
|  | [Edible part] dried tomato | Parts by mass |  |  |  |  |
|  | [Edible part] dried avocado | Parts by mass |  |  |  |  |
|  | [Edible part] dried apple | Parts by mass |  |  |  |  |
|  | [Edible part] dried konbu kelp | Parts by mass |  |  |  |  |
|  | [Edible part] dried cashew nut | Parts by mass |  |  |  |  |
|  | [Inedible part] dried corn (core) | Parts by mass |  |  |  |  |
|  | [Inedible part] dried bell pepper (seed, stem) | Parts by mass |  |  |  |  |
|  | [Inedible part] dried squash (seed, gut) | Parts by mass |  |  | 100 | 100 |
|  | [Inedible part] dried beet (skin) | Parts by mass |  |  |  |  |
|  | [Inedible part] dried broccoli (stalk, leaf) | Parts by mass |  |  |  |  |
|  | [Inedible part] dried edamame (pod) | Parts by mass |  |  |  |  |
|  | [Inedible part] dried tomato (stem) | Parts by mass |  |  |  |  |
|  | Olive oil | Parts by mass |  | 150 | 210 |  |
|  | Water | Parts by mass | 800 | 650 | 590 | 700 |
|  | Total | Parts by mass | 1000 | 1000 | 1000 | 1000 |
|  | Inedible part percentage | Mass % | 0.0% | 19.4% | 19.6% | 0.0% |
|  | Inedible part/(edible part + inedible part) | % | 0.0% | 50.0% | 50.0% | 0.0% |
|  | Available carbohydrate content in insoluble dietary fiber-containing food material | Mass % | 43 | 21 | 21 | 13 |

TABLE 3-continued

|  |  |  | | | | |
|---|---|---|---|---|---|---|
|  | Water activity of insoluble dietary fiber-containing food material |  | 0.413 | 0.442 | 0.459 | 0.35 |
| Microrefinement treatment conditions | Pretreatment |  | Jet mill | Jet mill | Jet mill | Jet mill |
|  | Microrefinement treatment method |  | Media agitating mill | Media agitating mill | Media agitating mill | Media agitating mill |
|  | Treatment time | Minutes | 20 | 5 | 5 | 5 |
|  | Bead size |  | Bead mill $\phi$1 mm bead | Bead mill $\phi$1 mm bead | Bead mill $\phi$1 mm bead | Bead mill $\phi$1 mm bead |
|  | Treatment temperature (immediately after starting) | (T1) ° C. | 22 | 23 | 21 | 21 |
|  | Treatment temperature (at time of completing treatment) | (T2) ° C. | 37 | 36 | 26 | 23 |
|  | Pressure applying condition at microrefining (Max pressure) | MPa | 0.36 | 0.11 | 0.15 | 0.46 |
| Measured values | Insoluble dietary fiber content | Mass % | 2.7% | 2.5% | 2.5% | 3.7% |
|  | Fine particle composite content | Mass % | 33.0 | 19.0 | 19.3 | 47.1 |
|  | Water content | Mass % | 80.8 | 66.2 | 60.4 | 71.2 |
|  | Total fat/oil content | Mass % | 0.4 | 15.4 | 21.6 | 6.0 |
|  | Water content/(water content + total fat/oil content) | % | 99.5% | 81.1% | 73.7% | 92.2% |

|  |  |  | Test Example | | | | |
|---|---|---|---|---|---|---|---|
|  |  |  | 32 | 33 | 34 | 35 | 36 |
| Formulation | [Edible part] dried carrot | Parts by mass |  |  |  |  |  |
|  | [Edible part] dried squash | Parts by mass |  |  |  |  |  |
|  | [Edible part] dried corn | Parts by mass |  |  |  |  |  |
|  | [Edible part] dried soybean | Parts by mass |  |  |  |  |  |
|  | [Edible part] dried edamame | Parts by mass | 30 | 200 | 30 |  |  |
|  | [Edible part] dried bell pepper | Parts by mass |  |  |  | 198 |  |
|  | [Edible part] dried beet | Parts by mass |  |  |  |  | 100 |
|  | [Edible part] dried green pea | Parts by mass |  |  |  |  |  |
|  | [Edible part] dried broccoli | Parts by mass |  |  |  |  |  |
|  | [Edible part] dried tomato | Parts by mass |  |  |  |  |  |
|  | [Edible part] dried avocado | Parts by mass |  |  |  |  |  |
|  | [Edible part] dried apple | Parts by mass |  |  |  |  |  |
|  | [Edible part] dried konbu kelp | Parts by mass |  |  |  |  |  |
|  | [Edible part] dried cashew nut | Parts by mass |  |  |  |  |  |
|  | [Inedible part] dried corn (core) | Parts by mass |  |  |  |  |  |
|  | [Inedible part] dried bell pepper (seed, stem) | Parts by mass |  |  |  | 2 |  |
|  | [Inedible part] dried squash (seed, gut) | Parts by mass |  |  |  |  |  |
|  | [Inedible part] dried beet (skin) | Parts by mass |  |  |  |  | 10 |
|  | [Inedible part] dried broccoli (stalk, leaf) | Parts by mass |  |  |  |  |  |
|  | [Inedible part] dried edamame (pod) | Parts by mass | 45 |  | 170 |  |  |
|  | [Inedible part] dried tomato (stem) | Parts by mass |  |  |  |  |  |
|  | Olive oil | Parts by mass |  |  | 150 | 100 | 80 |
|  | Water | Parts by mass | 925 | 800 | 650 | 700 | 810 |
|  | Total | Parts by mass | 1000 | 1000 | 1000 | 1000 | 1000 |
|  | Inedible part percentage | Mass % | 8.3% | 0.0% | 31.5% | 0.4% | 1.9% |
|  | Inedible part/(edible part + inedible part) | % | 60.0% | 0.0% | 85.0% | 1.0% | 9.1% |
|  | Available carbohydrate content in insoluble dietary fiber-containing food material | Mass % | 5 | 13 | 2 | 38 | 36 |
|  | Water activity of insoluble dietary fiber-containing food material |  | 0.336 | 0.328 | 0.352 | 0.386 | 0.426 |
| Microrefinement treatment conditions | Pretreatment |  | Jet mill | Jet mill | Jet mill | Jet mill | Jet mill |
|  | Microrefinement treatment method |  | Media agitating mill | Media agitating mill | Media agitating mill | Media agitating mill | Media agitating mill |
|  | Treatment time | Minutes | 5 | 5 | 5 | 5 | 5 |
|  | Bead size |  | Bead mill $\phi$1 mm bead | Bead mill $\phi$1 mm bead | Bead mill $\phi$1 mm bead | Bead mill $\phi$1 mm bead | Bead mill $\phi$1 mm bead |
|  | Treatment temperature (immediately after starting) | (T1) ° C. | 20 | 22 | 22 | 20 | 23 |
|  | Treatment temperature (at time of completing treatment) | (T2) ° C. | 32 | 23 | 30 | 28 | 33 |
|  | Pressure applying condition at microrefining (Max pressure) | MPa | 0.08 | 0.29 | 0.11 | 0.20 | 0.11 |

TABLE 3-continued

| | | | | | | | |
|---|---|---|---|---|---|---|---|
| Measured values | Insoluble dietary fiber content | Mass % | 1.0% | 2.5% | 2.8% | 2.3% | 1.7% |
| | Fine particle composite content | Mass % | 7.8 | 34.4 | 9.1 | 36.1 | 17.2 |
| | Water content | Mass % | 92.6 | 80.8 | 65.9 | 70.6 | 81.5 |
| | Total fat/oil content | Mass % | 0.6 | 4.0 | 15.8 | 10.7 | 8.4 |
| | Water content/(water content + total fat/oil content) | % | 99.4% | 95.3% | 80.7% | 86.9% | 90.7% |

| | | | | Test Example | | | |
|---|---|---|---|---|---|---|---|
| | | | | 37 | 38 | 39 | 40 | 41 |
| Formulation | [Edible part] dried carrot | Parts by mass | | | | | |
| | [Edible part] dried squash | Parts by mass | | | | | |
| | [Edible part] dried corn | Parts by mass | | | | | |
| | [Edible part] dried soybean | Parts by mass | | | | | |
| | [Edible part] dried edamame | Parts by mass | | | | | |
| | [Edible part] dried bell pepper | Parts by mass | | | | | |
| | [Edible part] dried beet | Parts by mass | | | | | |
| | [Edible part] dried green pea | Parts by mass | | 40 | | | |
| | [Edible part] dried broccoli | Parts by mass | | | 30 | | |
| | [Edible part] dried tomato | Parts by mass | | | | 20 | |
| | [Edible part] dried avocado | Parts by mass | | | | | |
| | [Edible part] dried apple | Parts by mass | | | | | |
| | [Edible part] dried konbu kelp | Parts by mass | | | | | 200 |
| | [Edible part] dried cashew nut | Parts by mass | | | | | | 100 |
| | [Inedible part] dried corn (core) | Parts by mass | | | | | |
| | [Inedible part] dried bell pepper (seed, stem) | Parts by mass | | | | | |
| | [Inedible part] dried squash (seed, gut) | Parts by mass | | | | | |
| | [Inedible part] dried beet (skin) | Parts by mass | | | | | |
| | [Inedible part] dried broccoli (stalk, leaf) | Parts by mass | | | 70 | | |
| | [Inedible part] dried edamame (pod) | Parts by mass | | | | | |
| | [Inedible part] dried tomato (stem) | Parts by mass | | | | 10 | |
| | Olive oil | Parts by mass | | 60 | 40 | 20 | 1 | |
| | Water | Parts by mass | | 900 | 860 | 950 | 799 | 900 |
| | Total | Parts by mass | | 1000 | 1000 | 1000 | 1000 | 1000 |
| | Inedible part percentage | Mass % | | 0.0% | 13.1% | 2.0% | 0.0% | 0.0% |
| | Inedible part/(edible part + inedible part) | % | | 0.0% | 70.0% | 33.3% | 0.0% | 0.0% |
| | Available carbohydrate content in insoluble dietary fiber-containing food material | Mass % | | 19 | 10 | 32 | 6 | 5 |
| | Water activity of insoluble dietary fiber-containing food material | | | 0.447 | 0.372 | 0.497 | 0.447 | 0.485 |
| Microrefinement treatment conditions | Pretreatment | | | Jet mill | Jet mill | Jet mill | Pin mill | Pin mill |
| | Microrefinement treatment method | | | Media agitating mill | Media agitating mill | Media agitating mill | — | — |
| | Treatment time | Minutes | | 5 | 5 | 5 | — | — |
| | Bead size | | | Bead mill ϕ1 mm bead | Bead mill ϕ1 mm bead | Bead mill ϕ1 mm bead | — | — |
| | Treatment temperature (immediately after starting) | (T1) ° C. | | 22 | 22 | 21 | — | — |
| | Treatment temperature (at time of completing treatment) | (T2) ° C. | | 27 | 34 | 31 | — | — |
| | Pressure applying condition at microrefining (Max pressure) | MPa | | 0.05 | 0.07 | 0.01 | 0 (Normal pressure) | 0 (Normal pressure) |
| Measured values | Insoluble dietary fiber content | Mass % | | 1.0% | 1.7% | 0.4% | 5.6% | 0.7% |
| | Fine particle composite content | Mass % | | 7.8 | 17.5 | 6.6 | 33.8 | 19.0 |
| | Water content | Mass % | | 90.4 | 86.3 | 95.2 | 79.9 | 90.0 |
| | Total fat/oil content | Mass % | | 6.0 | 4.0 | 2.0 | 0.1 | 4.8 |
| | Water content/(water content + total fat/oil content) | % | | 93.8% | 95.6% | 97.9% | 99.9% | 95.0% |

TABLE 4

| | | | Test Example | | | |
|---|---|---|---|---|---|---|
| | <Analysis value> | | 1 | 2 | 3 | 4 |
| Before ultrasonication | Maximum particle size before ultrasonication | μm | 995.6 | 1408.0 | 296.0 | 176.0 |
| | d50 before ultrasonication | μm | 96.57 | 76.83 | 19.19 | 25.25 |

TABLE 4-continued

|  |  |  |  |  |  |  |  |
|---|---|---|---|---|---|---|---|
|  | Modal diameter before ultrasonication |  | μm | 322.80 | 40.35 | 18.50 | 18.50 |
|  | Specific surface area per unit volume before ultrasonication | :γB | m²/ml | 0.33 | 0.15 | 0.42 | 0.56 |
|  | "Long diameter" by particle shape image analyzer | :α | 90 Percentile value (in 10,000 samples) | 6.53 | 10.00 | 11.65 | 12.67 |
|  | "Short diameter" by particle shape image analyzer | :β | 90 Percentile value (in 10,000 samples) | 5.54 | 6.60 | 6.96 | 8.59 |
|  | "Degree of unevenness" by particle shape image analyzer | :ω | 10 Percentile value (in 10,000 samples) | 0.88 | 0.73 | 0.68 | 0.80 |
|  | α/β | :N(I) |  | 1.18 | 1.52 | 1.67 | 1.48 |
|  | (α/β)/ω | :N(II) |  | 1.34 | 2.09 | 2.47 | 1.84 |
| After ultrasonication | Maximum particle size after ultrasonication |  | μm | 104.7 | 88.0 | 271.4 | 176.0 |
|  | d50 after ultrasonication |  | μm | 18.90 | 13.03 | 17.13 | 24.14 |
|  | Modal diameter after ultrasonication |  | μm | 22.00 | 15.56 | 15.56 | 23.99 |
|  | Specific surface area per unit volume after ultrasonication | :γA | m²/ml | 0.41 | 0.58 | 0.58 | 0.81 |
|  | α/β × γA | :N(III) |  | 0.49 | 0.87 | 0.97 | 1.20 |
|  | γB/γA |  |  | 0.80 | 0.26 | 0.73 | 0.69 |
|  | Emulsification capacity |  | % | 100% | 400% | 400% | 340% |
| Sensory inspection (arithmetic mean) | Dryness control |  |  | 3 | 5 | 5 | 4 |
|  | Oil separation control |  |  | 2 | 4 | 4 | 5 |
|  | Taste of fat/oil-containing dish |  |  | 3 | 5 | 5 | 5 |
|  | Astringent taste |  |  | 2 | 5 | 5 | 5 |
|  | Stability (prevention from syneresis) |  |  | 1 | 4 | 5 | 5 |
|  | Stability (prevention from dryness) |  |  | 4 | 5 | 5 | 4 |
| Sensory inspection (standard deviation) | Dryness control |  |  | 0 | 0.33 | 0 | 0 |
|  | Oil separation control |  |  | 0.5 | 0 | 0.33 | 0 |
|  | Taste of fat/oil-containing dish |  |  | 0.5 | 0.33 | 0.33 | 0 |
|  | Astringent taste |  |  | 0.5 | 0 | 0 | 0 |
|  | Stability (prevention from syneresis) |  |  | 0 | 0 | 0.33 | 0 |
|  | Stability (prevention from dryness) |  |  | 0 | 0.33 | 0 | 0.44 |

|  |  |  |  | Test Example | | | |
|---|---|---|---|---|---|---|---|
|  | \<Analysis value\> |  |  | 5 | 6 | 7 | 8 |
| Before ultrasonication | Maximum particle size before ultrasonication |  | μm | 191.9 | 995.6 | 296.0 | 228.2 |
|  | d50 before ultrasonication |  | μm | 27.84 | 65.73 | 17.07 | 26.45 |
|  | Modal diameter before ultrasonication |  | μm | 20.17 | 37.00 | 12.00 | 20.17 |
|  | Specific surface area per unit volume before ultrasonication | :γB | m²/ml | 0.67 | 0.32 | 0.47 | 0.68 |
|  | "Long diameter" by particle shape image analyzer | :α | 90 Percentile value (in 10,000 samples) | 9.89 | 14.26 | 13.36 | 11.74 |
|  | "Short diameter" by particle shape image analyzer | :β | 90 Percentile value (in 10,000 samples) | 6.21 | 8.19 | 7.13 | 5.44 |
|  | "Degree of unevenness" by particle shape image analyzer | :ω | 10 Percentile value (in 10,000 samples) | 0.78 | 0.69 | 0.65 | 0.63 |
|  | α/β | :N(I) |  | 1.59 | 1.74 | 1.87 | 2.16 |
|  | (α/β)/ω | :N(II) |  | 2.05 | 2.54 | 2.88 | 3.40 |
| After ultrasonication | Maximum particle size after ultrasonication |  | μm | 176.0 | 135.7 | 296.0 | 228.2 |
|  | d50 after ultrasonication |  | μm | 26.92 | 25.43 | 9.11 | 20.03 |
|  | Modal diameter after ultrasonication |  | μm | 26.16 | 26.16 | 9.25 | 20.17 |
|  | Specific surface area per unit volume after ultrasonication | :γA | m²/ml | 0.84 | 0.67 | 0.98 | 0.89 |
|  | α/β × γA | :N(III) |  | 1.34 | 1.17 | 1.83 | 1.92 |
|  | γB/γA |  |  | 0.79 | 0.48 | 0.48 | 0.76 |
|  | Emulsification capacity |  | % | 400% | 300% | 430% | 500% |
| Sensory inspection (arithmetic mean) | Dryness control |  |  | 4 | 5 | 4 | 5 |
|  | Oil separation control |  |  | 5 | 4 | 5 | 5 |
|  | Taste of fat/oil-containing dish |  |  | 5 | 4 | 5 | 5 |

TABLE 4-continued

| | | | | | | | |
|---|---|---|---|---|---|---|---|
| Sensory inspection (standard deviation) | Astringent taste | | | 5 | 5 | 5 | 5 |
| | Stability (prevention from syneresis) | | | 5 | 4 | 5 | 5 |
| | Stability (prevention from dryness) | | | 4 | 4 | 4 | 4 |
| | Dryness control | | | 0.33 | 0 | 0 | 0 |
| | Oil separation control | | | 0.33 | 0 | 0 | 0 |
| | Taste of fat/oil-containing dish | | | 0 | 0 | 0.33 | 0.33 |
| | Astringent taste | | | 0 | 0 | 0 | 0.33 |
| | Stability (prevention from syneresis) | | | 0 | 0.33 | 0.33 | 0.33 |
| | Stability (prevention from dryness) | | | 0 | 0.5 | 0.33 | 0 |

| | | | | Test Example | | | |
|---|---|---|---|---|---|---|---|
| | <Analysis value> | | | 9 | 10 | 11 | 12 |
| Before ultrasonication | Maximum particle size before ultrasonication | | μm | 1291.0 | 209.3 | 176.0 | 148.0 |
| | d50 before ultrasonication | | μm | 444.00 | 21.07 | 16.07 | 17.95 |
| | Modal diameter before ultrasonication | | μm | 418.60 | 23.99 | 23.99 | 23.99 |
| | Specific surface area per unit volume before ultrasonication | :γB | m²/ml | 0.14 | 0.33 | 0.60 | 0.71 |
| | "Long diameter" by particle shape image analyzer | :α | 90 Percentile value (in 10,000 samples) | 21.72 | 12.67 | 10.95 | 11.74 |
| | "Short diameter" by particle shape image analyzer | :β | 90 Percentile value (in 10,000 samples) | 20.68 | 10.19 | 7.13 | 6.86 |
| | "Degree of unevenness" by particle shape image analyzer | :ω | 10 Percentile value (in 10,000 samples) | 0.88 | 0.87 | 0.66 | 0.68 |
| | α/β | :N(I) | | 1.05 | 1.24 | 1.54 | 1.71 |
| | (α/β)/ω | :N(II) | | 1.20 | 1.43 | 2.34 | 2.52 |
| After ultrasonication | Maximum particle size after ultrasonication | | μm | 497.8 | 148.0 | 176.0 | 176.0 |
| | d50 after ultrasonication | | μm | 115.10 | 17.10 | 15.79 | 17.93 |
| | Modal diameter after ultrasonication | | μm | 95.96 | 22.00 | 26.16 | 26.16 |
| | Specific surface area per unit volume after ultrasonication | :γA | m²/ml | 0.15 | 0.43 | 0.85 | 0.91 |
| | α/β × γA | :N(III) | | 0.16 | 0.54 | 1.31 | 1.55 |
| | γB/γA | | | 0.92 | 0.76 | 0.70 | 0.79 |
| | Emulsification capacity | | % | 50% | 100% | 400% | 500% |
| Sensory inspection (arithmetic mean) | Dryness control | | | 3 | 4 | 5 | 5 |
| | Oil separation control | | | 3 | 4 | 4 | 5 |
| | Taste of fat/oil-containing dish | | | 2 | 4 | 4 | 4 |
| | Astringent taste | | | 1 | 4 | 5 | 5 |
| | Stability (prevention from syneresis) | | | 1 | 4 | 4 | 4 |
| | Stability (prevention from dryness) | | | 1 | 4 | 4 | 5 |
| Sensory inspection (standard deviation) | Dryness control | | | 0.33 | 0.33 | 0.33 | 0.44 |
| | Oil separation control | | | 0.6 | 0 | 0.33 | 0 |
| | Taste of fat/oil-containing dish | | | 0 | 0.33 | 0.33 | 0.33 |
| | Astringent taste | | | 0 | 0.44 | 0.33 | 0.33 |
| | Stability (prevention from syneresis) | | | 0 | 0 | 0.33 | 0.33 |
| | Stability (prevention from dryness) | | | 0 | 0.33 | 0.5 | 0.44 |

| | | | | Test Example | | |
|---|---|---|---|---|---|---|
| | <Analysis value> | | | 13 | 14 | 15 |
| Before ultrasonication | Maximum particle size before ultrasonication | | μm | 148.0 | 2000.0 | 497.8 |
| | d50 before ultrasonication | | μm | 17.33 | 409.40 | 33.98 |
| | Modal diameter before ultrasonication | | μm | 20.17 | 418.60 | 40.35 |
| | Specific surface area per unit volume before ultrasonication | :γB | m²/ml | 0.74 | 0.18 | 0.31 |
| | "Long diameter" by particle shape image analyzer | :α | 90 Percentile value (in 10,000 samples) | 9.89 | 16.31 | 14.94 |

TABLE 4-continued

|  |  |  |  |  |  |  |
|---|---|---|---|---|---|---|
| | "Short diameter" by particle shape image analyzer | :β | 90 Percentile value (in 10,000 samples) | 5.44 | 14.43 | 11.79 |
| | "Degree of unevenness" by particle shape image analyzer | :ω | 10 Percentile value (in 10,000 samples) | 0.63 | 0.82 | 0.90 |
| | α/β | :N(I) | | 1.82 | 1.13 | 1.27 |
| | (α/β)/ω | :N(II) | | 2.89 | 1.38 | 1.41 |
| After ultrasonication | Maximum particle size after ultrasonication | | μm | 148.0 | 1184.0 | 352.0 |
| | d50 after ultrasonication | | μm | 16.94 | 179.45 | 26.66 |
| | Modal diameter after ultrasonication | | μm | 23.99 | 296.00 | 52.33 |
| | Specific surface area per unit volume after ultrasonication | :γA | m²/ml | 1.07 | 0.20 | 0.51 |
| | α/β × γA | :N(III) | | 1.94 | 0.23 | 0.64 |
| | γB/γA | | | 0.69 | 0.90 | 0.62 |
| | Emulsification capacity | | % | 400% | 30% | 100% |
| Sensory inspection (arithmetic mean) | Dryness control | | | 5 | 5 | 4 |
| | Oil separation control | | | 5 | 5 | 4 |
| | Taste of fat/oil-containing dish | | | 5 | 1 | 4 |
| | Astringent taste | | | 5 | 2 | 4 |
| | Stability (prevention from syneresis) | | | 5 | 1 | 4 |
| | Stability (prevention from dryness) | | | 5 | 1 | 4 |
| Sensory inspection (standard deviation) | Dryness control | | | 0 | 0 | 0 |
| | Oil separation control | | | 0.33 | 0 | 0.33 |
| | Taste of fat/oil-containing dish | | | 0 | 0.5 | 0.33 |
| | Astringent taste | | | 0.33 | 0 | 0 |
| | Stability (prevention from syneresis) | | | 0 | 0 | 0.33 |
| | Stability (prevention from dryness) | | | 0 | 0 | 0.44 |

| | | | | Test Example | | | |
|---|---|---|---|---|---|---|---|
| | <Analysis value> | | | 16 | 17 | 18 | 19 |
| Before ultrasonication | Maximum particle size before ultrasonication | | μm | 296.0 | 248.9 | 148.0 | 1826.0 |
| | d50 before ultrasonication | | μm | 23.08 | 20.41 | 16.42 | 587.00 |
| | Modal diameter before ultrasonication | | μm | 37.00 | 31.11 | 22.00 | 645.60 |
| | Specific surface area per unit volume before ultrasonication | :γB | m²/ml | 0.56 | 0.59 | 0.65 | 0.04 |
| | "Long diameter" by particle shape image analyzer | :α | 90 Percentile value (in 10,000 samples) | 14.10 | 14.30 | 13.74 | 23.68 |
| | "Short diameter" by particle shape image analyzer | :β | 90 Percentile value (in 10,000 samples) | 8.50 | 8.10 | 7.10 | 20.37 |
| | "Degree of unevenness" by particle shape image analyzer | :ω | 10 Percentile value (in 10,000 samples) | 0.62 | 0.62 | 0.60 | 0.85 |
| | α/β | :N(I) | | 1.66 | 1.77 | 1.94 | 1.16 |
| | (α/β)/ω | :N(II) | | 2.68 | 2.84 | 3.21 | 1.36 |
| After ultrasonication | Maximum particle size after ultrasonication | | μm | 296.0 | 248.9 | 148.0 | 167.4 |
| | d50 after ultrasonication | | μm | 24.01 | 20.75 | 16.66 | 510.00 |
| | Modal diameter after ultrasonication | | μm | 40.35 | 28.53 | 22.00 | 542.90 |
| | Specific surface area per unit volume after ultrasonication | :γA | m²/ml | 0.78 | 0.74 | 0.90 | 0.04 |
| | α/β × γA | :N(III) | | 1.29 | 1.30 | 1.74 | 0.05 |
| | γB/γA | | | 0.72 | 0.80 | 0.72 | 1.00 |
| | Emulsification capacity | | % | 400% | 500% | 500% | 30% |
| Sensory inspection (arithmetic mean) | Dryness control | | | 5 | 5 | 5 | 3 |
| | Oil separation control | | | 5 | 5 | 5 | 1 |
| | Taste of fat/oil-containing dish | | | 5 | 5 | 5 | 1 |
| | Astringent taste | | | 5 | 5 | 5 | 1 |
| | Stability (prevention from syneresis) | | | 4 | 4 | 5 | 1 |
| | Stability (prevention from dryness) | | | 4 | 5 | 5 | 1 |
| Sensory inspection | Dryness control | | | 0.33 | 0 | 0 | 0 |
| | Oil separation control | | | 0.33 | 0.33 | 0.5 | 0.33 |

TABLE 4-continued

| (standard deviation) | Taste of fat/oil-containing dish | | | 0 | 0.44 | 0.33 | 0 |
|---|---|---|---|---|---|---|---|
| | Astringent taste | | | 0.33 | 0 | 0 | 0 |
| | Stability (prevention from syneresis) | | | 0.44 | 0.5 | 0 | 0 |
| | Stability (prevention from dryness) | | | 0 | 0 | 0 | 0.33 |

| | | | | Test Example | | | |
|---|---|---|---|---|---|---|---|
| | <Analysis value> | | | 20 | 21 | 22 | 23 |
| Before ultrasonication | Maximum particle size before ultrasonication | | μm | 418.6 | 418.6 | 352.0 | 284.9 |
| | d50 before ultrasonication | | μm | 68.46 | 54.38 | 45.72 | 35.07 |
| | Modal diameter before ultrasonication | | μm | 88.00 | 67.86 | 88.00 | 47.98 |
| | Specific surface area per unit volume before ultrasonication | :γB | m²/ml | 0.10 | 0.18 | 0.21 | 0.27 |
| | "Long diameter" by particle shape image analyzer | :α | 90 Percentile value (in 10,000 samples) | 20.00 | 20.28 | 16.22 | 18.93 |
| | "Short diameter" by particle shape image analyzer | :β | 90 Percentile value (in 10,000 samples) | 16.78 | 10.13 | 7.46 | 7.95 |
| | "Degree of unevenness" by particle shape image analyzer | :ω | 10 Percentile value (in 10,000 samples) | 0.93 | 0.56 | 0.52 | 0.51 |
| | α/β | :N(I) | | 1.19 | 2.00 | 2.17 | 2.38 |
| | (α/β)/ω | :N(II) | | 1.28 | 3.57 | 4.17 | 4.69 |
| After ultrasonication | Maximum particle size after ultrasonication | | μm | 497.8 | 352.0 | 352.0 | 248.9 |
| | d50 after ultrasonication | | μm | 82.26 | 56.74 | 47.99 | 35.76 |
| | Modal diameter after ultrasonication | | μm | 95.96 | 67.86 | 95.96 | 47.98 |
| | Specific surface area per unit volume after ultrasonication | :γA | m²/ml | 0.13 | 0.28 | 0.31 | 0.47 |
| | α/β × γA | :N(III) | | 0.16 | 0.56 | 0.68 | 1.13 |
| | γB/γA | | | 0.76 | 0.66 | 0.68 | 0.58 |
| | Emulsification capacity | | % | 400% | 400% | 500% | 400% |
| Sensory inspection (arithmetic mean) | Dryness control | | | 2 | 5 | 5 | 5 |
| | Oil separation control | | | 3 | 5 | 5 | 5 |
| | Taste of fat/oil-containing dish | | | 3 | 5 | 5 | 5 |
| | Astringent taste | | | 3 | 5 | 5 | 5 |
| | Stability (prevention from syneresis) | | | 3 | 4 | 4 | 4 |
| | Stability (prevention from dryness) | | | 3 | 4 | 5 | 5 |
| Sensory inspection (standard deviation) | Dryness control | | | 0.33 | 0 | 0.44 | 0 |
| | Oil separation control | | | 0.33 | 0 | 0.44 | 0.44 |
| | Taste of fat/oil-containing dish | | | 0 | 0.33 | 0 | 0.33 |
| | Astringent taste | | | 0.67 | 0.33 | 0.33 | 0 |
| | Stability (prevention from syneresis) | | | 0.33 | 0 | 0.33 | 0.5 |
| | Stability (prevention from dryness) | | | 0.5 | 0.33 | 0 | 0 |

| | | | | Test Example | | | |
|---|---|---|---|---|---|---|---|
| | <Analysis value> | | | 24 | 25 | 26 | 27 |
| Before ultrasonication | Maximum particle size before ultrasonication | | μm | 995.6 | 209.3 | 176.0 | 176.0 |
| | d50 before ultrasonication | | μm | 28.15 | 34.18 | 22.73 | 20.60 |
| | Modal diameter before ultrasonication | | μm | 23.99 | 47.98 | 23.99 | 20.17 |
| | Specific surface area per unit volume before ultrasonication | :γB | m²/ml | 0.29 | 0.26 | 0.33 | 0.37 |
| | "Long diameter" by particle shape image analyzer | :α | 90 Percentile value (in 10,000 samples) | 14.06 | 24.53 | 26.66 | 25.80 |
| | "Short diameter" by particle shape image analyzer | :β | 90 Percentile value (in 10,000 samples) | 8.69 | 22.34 | 20.64 | 13.44 |

TABLE 4-continued

|  |  |  |  |  |  |  |  |
|---|---|---|---|---|---|---|---|
|  | "Degree of unevenness" by particle shape image analyzer | :ω | 10 Percentile value (in 10,000 samples) | 0.61 | 0.81 | 0.70 | 0.67 |
|  | α/β | :N(I) |  | 1.62 | 1.10 | 1.29 | 1.92 |
|  | (α/β)/ω | :N(II) |  | 2.64 | 1.36 | 1.85 | 2.86 |
| After ultrasonication | Maximum particle size after ultrasonication |  | μm | 995.6 | 209.3 | 176.0 | 176.0 |
|  | d50 after ultrasonication |  | μm | 15.51 | 31.69 | 20.91 | 19.00 |
|  | Modal diameter after ultrasonication |  | μm | 12.00 | 44.00 | 28.53 | 20.17 |
|  | Specific surface area per unit volume after ultrasonication | :γA | m$^2$/ml | 0.80 | 0.39 | 0.49 | 0.54 |
|  | α/β × γA | :N(III) |  | 1.29 | 0.43 | 0.64 | 1.03 |
|  | γB/γA |  |  | 0.36 | 0.66 | 0.66 | 0.68 |
|  | Emulsification capacity |  | % | 340% | 280% | 400% | 500% |
| Sensory inspection (arithmetic mean) | Dryness control |  |  | 5 | 4 | 5 | 5 |
|  | Oil separation control |  |  | 4 | 3 | 5 | 5 |
|  | Taste of fat/oil-containing dish |  |  | 5 | 3 | 5 | 5 |
|  | Astringent taste |  |  | 5 | 2 | 4 | 5 |
|  | Stability (prevention from syneresis) |  |  | 5 | 3 | 4 | 5 |
|  | Stability (prevention from dryness) |  |  | 5 | 1 | 4 | 5 |
| Sensory inspection (standard deviation) | Dryness control |  |  | 0.33 | 0 | 0.33 | 0.44 |
|  | Oil separation control |  |  | 0.33 | 0.44 | 0 | 0 |
|  | Taste of fat/oil-containing dish |  |  | 0 | 0.5 | 0.33 | 0.33 |
|  | Astringent taste |  |  | 0.33 | 0 | 0.5 | 0.33 |
|  | Stability (prevention from syneresis) |  |  | 0 | 0.33 | 0.33 | 0.33 |
|  | Stability (prevention from dryness) |  |  | 0.33 | 0 | 0 | 0 |

|  |  |  |  | Test Example | | | |
|---|---|---|---|---|---|---|---|
|  | <Analysis value> |  |  | 28 | 29 | 30 | 31 |
| Before ultrasonication | Maximum particle size before ultrasonication |  | μm | 148.0 | 418.6 | 456.5 | 837.2 |
|  | d50 before ultrasonication |  | μm | 23.70 | 18.38 | 15.40 | 41.10 |
|  | Modal diameter before ultrasonication |  | μm | 26.16 | 14.27 | 14.27 | 31.11 |
|  | Specific surface area per unit volume before ultrasonication | :γB | m$^2$/ml | 0.30 | 0.42 | 0.56 | 0.29 |
|  | "Long diameter" by particle shape image analyzer | :α | 90 Percentile value (in 10,000 samples) | 20.55 | 16.62 | 15.12 | 13.80 |
|  | "Short diameter" by particle shape image analyzer | :β | 90 Percentile value (in 10,000 samples) | 10.19 | 11.02 | 12.21 | 9.91 |
|  | "Degree of unevenness" by particle shape image analyzer | :ω | 10 Percentile value (in 10,000 samples) | 0.61 | 0.61 | 0.74 | 0.80 |
|  | α/β | :N(I) |  | 2.02 | 1.51 | 1.24 | 1.39 |
|  | (α/β)/ω | :N(II) |  | 3.29 | 2.46 | 1.67 | 1.74 |
| After ultrasonication | Maximum particle size after ultrasonication |  | μm | 176.0 | 592 | 497.8 | 542.9 |
|  | d50 after ultrasonication |  | μm | 17.69 | 11.49 | 12.32 | 35.90 |
|  | Modal diameter after ultrasonication |  | μm | 22.00 | 12.00 | 11.00 | 28.53 |
|  | Specific surface area per unit volume after ultrasonication | :γA | m$^2$/ml | 0.59 | 0.82 | 0.88 | 0.43 |
|  | α/β × γA | :N(III) |  | 1.19 | 1.23 | 1.09 | 0.60 |
|  | γB/γA |  |  | 0.51 | 0.51 | 0.64 | 0.67 |
|  | Emulsification capacity |  | % | 400% | 390% | 300% | 500% |
| Sensory inspection (arithmetic mean) | Dryness control |  |  | 5 | 4 | 3 | 5 |
|  | Oil separation control |  |  | 5 | 4 | 2 | 5 |
|  | Taste of fat/oil-containing dish |  |  | 5 | 4 | 2 | 5 |
|  | Astringent taste |  |  | 5 | 5 | 4 | 5 |
|  | Stability (prevention from syneresis) |  |  | 4 | 5 | 3 | 4 |
|  | Stability (prevention from dryness) |  |  | 5 | 4 | 4 | 4 |
| Sensory inspection (standard deviation) | Dryness control |  |  | 0.33 | 0.33 | 0.44 | 0 |
|  | Oil separation control |  |  | 0 | 0.5 | 0.33 | 0.33 |
|  | Taste of fat/oil-containing dish |  |  | 0 | 0.5 | 0 | 0.33 |

TABLE 4-continued

|  |  |  |  |  |  |  |  |
|---|---|---|---|---|---|---|---|
|  | Astringent taste |  |  | 0.33 | 0.33 | 0.44 | 0 |
|  | Stability (prevention from syneresis) |  |  | 0 | 0 | 0.5 | 0 |
|  | Stability (prevention from dryness) |  |  | 0 | 0 | 0 | 0 |

|  |  |  |  | Test Example | | | | |
|---|---|---|---|---|---|---|---|---|
|  | <Analysis value> |  |  | 32 | 33 | 34 | 35 | 36 |
| Before ultrasonication | Maximum particle size before ultrasonication |  | μm | 228.2 | 542.9 | 497.8 | 352.0 | 1184.0 |
|  | d50 before ultrasonication |  | μm | 30.00 | 25.3 | 21.4 | 44.7 | 47.5 |
|  | Modal diameter before ultrasonication |  | μm | 22.00 | 20.2 | 17.0 | 88.0 | 74.0 |
|  | Specific surface area per unit volume before ultrasonication | :γB | m²/ml | 0.31 | 0.41 | 0.42 | 0.31 | 0.25 |
|  | "Long diameter" by particle shape image analyzer | :α | 90 Percentile value (in 10,000 samples) | 13.45 | 14.53 | 15.01 | 13.58 | 14.14 |
|  | "Short diameter" by particle shape image analyzer | :β | 90 Percentile value (in 10,000 samples) | 9.41 | 9.53 | 10.00 | 8.88 | 8.97 |
|  | "Degree of unevenness" by particle shape image analyzer | :ω | 10 Percentile value (in 10,000 samples) | 0.45 | 0.62 | 0.54 | 0.45 | 0.55 |
|  | α/β | :N(I) |  | 1.43 | 1.52 | 1.50 | 1.53 | 1.58 |
|  | (α/β)/ω | :N(II) |  | 3.18 | 2.46 | 2.78 | 3.40 | 2.87 |
| After ultrasonication | Maximum particle size after ultrasonication |  | μm | 176.0 | 322.8 | 296.0 | 248.9 | 1674.0 |
|  | d50 after ultrasonication |  | μm | 14.43 | 11.4 | 9.84 | 7.8 | 28.5 |
|  | Modal diameter after ultrasonication |  | μm | 14.27 | 12.0 | 11.00 | 10.1 | 15.6 |
|  | Specific surface area per unit volume after ultrasonication | :γA | m²/ml | 0.67 | 0.89 | 0.93 | 1.30 | 0.44 |
|  | α/β × γA | :N(III) |  | 0.95 | 1.36 | 1.40 | 1.99 | 0.70 |
|  | γB/γA |  |  | 0.47 | 0.46 | 0.45 | 0.23 | 0.57 |
|  | Emulsification capacity |  | % | 500% | 400% | 400% | 450% | 400% |
| Sensory inspection (arithmetic mean) | Dryness control |  |  | 4 | 5 | 4 | 4 | 4 |
|  | Oil separation control |  |  | 5 | 5 | 4 | 4 | 5 |
|  | Taste of fat/oil-containing dish |  |  | 5 | 5 | 5 | 5 | 5 |
|  | Astringent taste |  |  | 5 | 5 | 5 | 5 | 5 |
|  | Stability (prevention from syneresis) |  |  | 5 | 5 | 5 | 4 | 4 |
|  | Stability (prevention from dryness) |  |  | 4 | 4 | 4 | 4 | 4 |
| Sensory inspection (standard deviation) | Dryness control |  |  | 0 | 0 | 0 | 0 | 0.33 |
|  | Oil separation control |  |  | 0.33 | 0 | 0 | 0.33 | 0 |
|  | Taste of fat/oil-containing dish |  |  | 0 | 0 | 0.33 | 0 | 0 |
|  | Astringent taste |  |  | 0 | 0 | 0.33 | 0 | 0 |
|  | Stability (prevention from syneresis) |  |  | 0.33 | 0.33 | 0.44 | 0 | 0 |
|  | Stability (prevention from dryness) |  |  | 0.5 | 0.33 | 0 | 0.33 | 0 |

|  |  |  |  | Test Example | | | | |
|---|---|---|---|---|---|---|---|---|
|  | <Analysis value> |  |  | 37 | 38 | 39 | 40 | 41 |
| Before ultrasonication | Maximum particle size before ultrasonication |  | μm | 352.0 | 837.2 | 1291.0 | 114.1 | 271.4 |
|  | d50 before ultrasonication |  | μm | 48.9 | 67.0 | 99.4 | 51.2 | 145.0 |
|  | Modal diameter before ultrasonication |  | μm | 40.4 | 62.2 | 96.0 | 191.9 | 135.7 |
|  | Specific surface area per unit volume before ultrasonication | :γB | m²/ml | 0.19 | 0.25 | 0.22 | 0.19 | 0.25 |
|  | "Long diameter" by particle shape image analyzer | :α | 90 Percentile value (in 10,000 samples) | 12.65 | 28.30 | 32.70 | 11.20 | 13.54 |
|  | "Short diameter" by particle shape image analyzer | :β | 90 Percentile value (in 10,000 samples) | 8.20 | 18.30 | 21.20 | 8.90 | 9.11 |
|  | "Degree of unevenness" by particle shape image analyzer | :ω | 10 Percentile value (in 10,000 samples) | 0.56 | 0.61 | 0.42 | 0.78 | 0.70 |
|  | α/β | :N(I) |  | 1.54 | 1.55 | 1.54 | 1.26 | 1.49 |
|  | (α/β)/ω | :N(II) |  | 2.75 | 2.54 | 3.66 | 1.61 | 2.12 |

TABLE 4-continued

| | | | | | | | |
|---|---|---|---|---|---|---|---|
| After ultrasonication | Maximum particle size after ultrasonication | | μm | 296.0 | 767.7 | 1086.0 | 88.0 | 148.0 |
| | d50 after ultrasonication | | μm | 33.3 | 52.2 | 56.5 | 11.0 | 29.3 |
| | Modal diameter after ultrasonication | | μm | 31.1 | 40.4 | 44.0 | 14.3 | 31.1 |
| | Specific surface area per unit volume after ultrasonication | :γA | m²/ml | 0.37 | 0.50 | 0.42 | 0.76 | 0.80 |
| | α/β × γA | :N(III) | | 0.56 | 0.77 | 0.65 | 0.96 | 1.19 |
| | γB/γA | | | 0.53 | 0.51 | 0.53 | 0.25 | 0.31 |
| | Emulsification capacity | | % | 210% | 290% | 190% | 190% | 190% |
| Sensory inspection (arithmetic mean) | Dryness control | | | 4 | 4 | 4 | 4 | 4 |
| | Oil separation control | | | 5 | 5 | 5 | 4 | 4 |
| | Taste of fat/oil-containing dish | | | 4 | 4 | 4 | 4 | 4 |
| | Astringent taste | | | 5 | 5 | 5 | 5 | 5 |
| | Stability (prevention from syneresis) | | | 4 | 4 | 4 | 4 | 4 |
| | Stability (prevention from dryness) | | | 4 | 4 | 4 | 4 | 4 |
| Sensory inspection (standard deviation) | Dryness control | | | 0 | 0.33 | 0 | 0.33 | 0 |
| | Oil separation control | | | 0 | 0.33 | 0 | 0.33 | 0.5 |
| | Taste of fat/oil-containing dish | | | 0.33 | 0.33 | 0 | 0 | 0.33 |
| | Astringent taste | | | 0 | 0 | 0 | 0.33 | 0.33 |
| | Stability (prevention from syneresis) | | | 0.5 | 0.6 | 0.33 | 0.33 | 0 |
| | Stability (prevention from dryness) | | | 0 | 0 | 0.44 | 0.33 | 0 |

INDUSTRIAL APPLICABILITY

The composition of one or more embodiments may be applied in the food industry due to the unknown attribution of reducing the astringent taste described hereinbefore, and also due to the unknown attribution in the emulsification capacity enhancement described hereinbefore. One or more embodiments can be used more widely as a substitute for an emulsifier in other various fields in addition to the food product field, hence it can be industrially advantageous.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A composition comprising a fine particle composite comprising at least 0.1 mass % of an insoluble dietary fiber, wherein a total fat/oil content of the composition is less than 20 mass %,
wherein the composition has a maximum particle size that is larger than 100 μm and a modal diameter of 5 μm to 400 μm,
wherein, the ultrasonicated composition has a modal diameter of 0.3 μm to 100 μm in an ultrasonicated state, and
wherein the composition satisfies one or more of the group consisting of:
a numerical value N(I) determined by the following formula (I) is 1.30 or more;

$$N(I)=(\alpha/\beta) \tag{I}$$

a numerical value N(II) determined by the following formula (II) is 1.70 or more;

$$N(II)=(\alpha/\beta)/\omega \tag{II}$$ and a numerical value N(III) determined by the following formula (III) is 0.60 or more;

$$N(III)=(\alpha/\beta)\times\gamma_A \tag{III}$$

where α represents a 90 percentile value of a "long diameter" as measured by a particle shape image analyzer, β represents a 90 percentile value of a "short diameter" as measured by a particle shape image analyzer, ω represents a 10 percentile value of a "degree of unevenness" as measured by a particle shape image analyzer, and $\gamma_A$ represents a specific surface area per unit volume of the composition in an ultrasonicated state.

2. The composition according to claim 1, wherein a water content of the composition is 75% or more of the sum of the water content and the fat/oil content of the composition.

3. The composition according to claim 1, wherein a ratio of a specific surface area per unit volume of the composition ($\gamma_B$) to a specific surface area per unit volume of the composition in an ultrasonicated state ($\gamma_A$), ($\gamma_B/\gamma_A$), is 0.8 or less.

4. The composition according to claim 2, wherein the composition has an emulsification capacity of 50% or more.

5. The composition according to claim 1, wherein the composition contains the fine particle composite is in an amount of 4 to 98 mass %.

6. The composition according to claim 1, wherein the insoluble dietary fiber comprises fiber derived from one or more of an edible part and an inedible part of an insoluble dietary fiber-comprising food material.

7. The composition according to claim 6, wherein the insoluble dietary fiber includes fibers derived from an edible part and an inedible part of the same insoluble dietary fiber-comprising food material.

8. The composition according to claim 6, wherein the insoluble dietary fiber-comprising food material is one or more selected from the group consisting of nuts and seeds, grains, beans, vegetables, and fruits.

9. The composition according to claim 8, wherein the insoluble dietary fiber-comprising food material is one or more selected from the group consisting of carrots, squashes, corns, soybeans, edamame, bell peppers, beets, green peas, broccolis, and tomatoes.

10. The composition according to claim 9, wherein the inedible part of the insoluble dietary fiber-comprising food material is one or more selected from the group consisting of sweet corn cores, bell pepper seeds or stems, squash seeds or guts, beet skins, broccoli stalks and leaves, edamame pods, and tomato stems.

11. The composition according to claim 6, wherein the insoluble dietary fiber comprises a ground product of the insoluble dietary fiber-comprising food material.

12. The composition according to claim 11, wherein the ground product is a media agitating mill-treated product.

13. The composition according to claim 3, wherein the media agitating mill-treated product is a wet media agitating mill-treated product.

14. The composition according to claim 11, wherein the composition is ground until one or more of the following is satisfied:
the numerical value N(I) is increased by 5% or more;
the numerical value N(II) is increased by 5% or more; and
the numerical value N(III) is increased by 5% or more.

15. A food/drink product comprising the composition according to claim 1.

16. A liquid seasoning comprising the composition according to claim 1.

17. The method according to claim 16, wherein the grinding is media agitating mill treatment.

18. The method according to claim 17, wherein the grinding is wet media agitating mill treatment.

19. The method according to claim 17, wherein the media agitating mill treatment is carried out under an operating pressure of 0.01 MPa to 1 MPa.

20. The method according to claim 17, wherein the media agitating mill treatment is carried out while increasing the operating temperature from an initial temperature $T_1(° C.)$ to a final temperature $T_2(° C.)$ that satisfies the following formula (A):

$$T_1+1<T_2<T_1+50 \tag{A}$$

21. A method for producing the composition according to claim 1, the method comprising grinding an insoluble dietary fiber-comprising food material.

22. The method according to claim 21, wherein a water activity value of the insoluble dietary fiber-comprising food material is 0.95 or less.

23. The method according to claim 21, wherein the insoluble dietary fiber-comprising food material contains an available carbohydrate in an amount of 2 mass % or more.

24. The method according to claim 21, wherein the grinding is carried out until one or more of the following are satisfied:
the numerical value N(I) increased by 5% or more;
the numerical value N(II) increased by 5% or more; and
the numerical value N(III) determined by the formula (III) is increased by 5% or more.

25. A method for enhancing an emulsification capacity of a composition comprising an insoluble dietary fiber, the method comprising grinding the composition comprising an insoluble dietary fiber to obtain the composition according to claim 1.

26. A method for improving an astringent taste of a composition comprising an insoluble dietary fiber, the method comprising grinding the composition comprising an insoluble dietary fiber to obtain the composition according to claim 1.

27. A method for producing a liquid seasoning comprising the composition according to claim 1.

* * * * *

UNITED STATES PATENT AND TRADEMARK OFFICE
CERTIFICATE OF CORRECTION

PATENT NO. : 11,678,686 B2
APPLICATION NO. : 16/796650
DATED : June 20, 2023
INVENTOR(S) : Tatsuya Higuchi et al.

It is certified that error appears in the above-identified patent and that said Letters Patent is hereby corrected as shown below:

In the Claims

Replace Column 65, Line 47-Column 68, Line 35, (approx.) with the following Claims:
1. A composition comprising a fine particle composite comprising at least 0.1 mass % of an insoluble dietary fiber,
    wherein a total fat/oil content of the composition is less than 20 mass %,
    wherein the composition has a maximum particle size that is larger than 100 μm and a modal diameter of 5 μm to 400 μm,
    wherein, the ultrasonicated composition has a modal diameter of 0.3 μm to 100 μm_in an ultrasonicated state, and
    wherein the composition satisfies one or more of the group consisting of:
    a numerical value N(I) determined by the following formula (I) is 1.30 or more;
    $N(I)=(\alpha/\beta)$   (I)
    a numerical value N(II) determined by the following formula (II) is 1.70 or more;
    $N(II)=(\alpha/\beta)/\omega$   (II) and
    a numerical value N(III) determined by the following formula (III) is 0.60 or more;
    $N(III)=(\alpha/\beta)\times\gamma_A$   (III)
    where $\alpha$ represents a 90 percentile value of a "long diameter" as measured by a particle shape image analyzer, $\beta$ represents a 90 percentile value of a "short diameter" as measured by a particle shape image analyzer, $\omega$ represents a 10 percentile value of a "degree of unevenness" as measured by a particle shape image analyzer, and $\gamma_A$ represents a specific surface area per unit volume of the composition in an ultrasonicated state.
2. The composition according to claim 1, wherein a water content of the composition is 75% or more of the sum of the water content and the fat/oil content of the composition.
3. The composition according to claim 1, wherein a ratio of a specific surface area per unit volume of the composition ($\gamma_B$) to a specific surface area per unit volume of the composition in an ultrasonicated state ($\gamma_A$), ($\gamma_B/\gamma_A$), is 0.8 or less.
4. The composition according to claim 1, wherein the composition has an emulsification capacity of 50% or more.

Signed and Sealed this
Twenty-fourth Day of October, 2023

Katherine Kelly Vidal
*Director of the United States Patent and Trademark Office*

CERTIFICATE OF CORRECTION (continued)  Page 2 of 3
U.S. Pat. No. 11,678,686 B2

5. The composition according to claim 1, wherein the composition contains the fine particle composite is in an amount of 4 to 98 mass %.
6. The composition according to claim 1, wherein the insoluble dietary fiber comprises fiber derived from one or more of an edible part and an inedible part of an insoluble dietary fiber-comprising food material.
7. The composition according to claim 6, wherein the insoluble dietary fiber includes fibers derived from an edible part and an inedible part of the same insoluble dietary fiber-comprising food material.
8. The composition according to claim 6, wherein the insoluble dietary fiber-comprising food material is one or more selected from the group consisting of nuts and seeds, grains, beans, vegetables, and fruits.
9. The composition according to claim 8, wherein the insoluble dietary fiber-comprising food material is one or more selected from the group consisting of carrots, squashes, corns, soybeans, edamame, bell peppers, beets, green peas, broccolis, and tomatoes.
10. The composition according to claim 9, wherein the inedible part of the insoluble dietary fiber-comprising food material is one or more selected from the group consisting of sweet corn cores, bell pepper seeds or stems, squash seeds or guts, beet skins, broccoli stalks and leaves, edamame pods, and tomato stems.
11. The composition according to claim 6, wherein the insoluble dietary fiber comprises a ground product of the insoluble dietary fiber-comprising food material.
12. The composition according to claim 11, wherein the ground product is a media agitating mill-treated product.
13. The composition according to claim 12, wherein the media agitating mill-treated product is a wet media agitating mill-treated product.
14. The composition according to claim 11, wherein the composition is ground until one or more of the following is satisfied:
    the numerical value N(I) is increased by 5% or more;
    the numerical value N(II) is increased by 5% or more; and
    the numerical value N(III) is increased by 5% or more.
15. A food/drink product comprising the composition according to claim 1.
16. A liquid seasoning comprising the composition according to claim 1.
17. A method for producing the composition according to claim 1, the method comprising grinding an insoluble dietary fiber-comprising food material.
18. The method according to claim 17, wherein the grinding is media agitating mill treatment.
19. The method according to claim 17, wherein the grinding is wet media agitating mill treatment.
20. The method according to claim 17, wherein the media agitating mill treatment is carried out under an operating pressure of 0.01 MPa to 1 MPa.
21. The method according to claim 17, wherein the media agitating mill treatment is carried out while increasing the operating temperature from an initial temperature $T_1$(° C.) to a final temperature $T_2$(° C.) that satisfies the following formula (A):
$$T_1+1<T_2<T_1+50 \quad (A).$$
22. The method according to claim 17, wherein a water activity value of the insoluble dietary fiber-comprising food material is 0.95 or less.
23. The method according to claim 17, wherein the insoluble dietary fiber-comprising food material contains an available carbohydrate in an amount of 2 mass % or more.
24. The method according to claim 17, wherein the grinding is carried out until one or more of the following are satisfied:
- the numerical value N(I) increased by 5% or more;
- the numerical value N(II) increased by 5% or more; and
- the numerical value N(III) determined by the formula (III) is increased by 5% or more.

25. A method for enhancing an emulsification capacity of a composition comprising an insoluble dietary fiber, the method comprising grinding the composition comprising an insoluble dietary fiber to obtain the composition according to claim 1.
26. A method for improving an astringent taste of a composition comprising an insoluble dietary fiber, the method comprising grinding the composition comprising an insoluble dietary fiber to obtain the composition according to claim 1.
27. A method for producing a liquid seasoning comprising the composition according to claim 1.